(12) United States Patent
Symes et al.

(10) Patent No.: US 12,743,610 B2
(45) Date of Patent: Sep. 22, 2026

(54) METHODS AND SYSTEMS FOR HANDLING OPERATIONS IN SEQUENCE FOR NEURAL NETWORK PROCESSING

(71) Applicant: Arm Limited, Cambridge (GB)

(72) Inventors: Dominic Hugo Symes, Cambridge (GB); Robert Norberg, Hjärup (SE); Tomas Fredrik Edsö, Lund (SE); Rajanarayana Priyanka Marigi, Lund (SE); Douglas William Troha, Lund (SE)

(73) Assignee: Arm Limited, Cambridge (GB)

(*) Notice: Subject to any disclaimer, the term of this patent is extended or adjusted under 35 U.S.C. 154(b) by 946 days.

(21) Appl. No.: 17/938,217

(22) Filed: Oct. 5, 2022

(65) Prior Publication Data

US 2023/0186045 A1 Jun. 15, 2023

(30) Foreign Application Priority Data

Oct. 8, 2021 (GB) ...................................... 2114426

(51) Int. Cl.

*G06N 20/00* (2019.01)
*G06N 3/063* (2023.01)
*G06N 3/10* (2006.01)
*G06F 9/50* (2006.01)
*G06N 3/04* (2023.01)

(52) U.S. Cl.

CPC ............... *G06N 3/063* (2013.01); *G06N 3/10* (2013.01); *G06F 9/5016* (2013.01); *G06F 9/5038* (2013.01); *G06N 3/04* (2013.01)

(58) Field of Classification Search

CPC ............ G06N 3/063; G06N 3/10; G06N 3/04; G06F 9/5016; G06F 9/5038

USPC ............................................................ 706/15

See application file for complete search history.

(56) References Cited

U.S. PATENT DOCUMENTS

| | | | | |
|---|---|---|---|---|
| 2018/0107506 | A1 | 4/2018 | Suzuki et al. | |
| 2018/0373540 | A1 | 12/2018 | Bao et al. | |
| 2019/0042923 | A1* | 2/2019 | Janedula | G06N 3/044 |
| 2019/0303762 | A1 | 10/2019 | Sui et al. | |

(Continued)

OTHER PUBLICATIONS

Qin, et al. (Jan. 10, 2019) "Accelerating Deep Neural Networks by Combining Block-Circulant Matrices and Low-Precision Weights," Electronics, 2019, 8, 78; doi:10.3390. (Year: 2019).*

(Continued)

*Primary Examiner* — David R Vincent
(74) *Attorney, Agent, or Firm* — Pearl Cohen LLP

(57) ABSTRACT

A sequence of operations to process an initial input data array for the sequence of operations to generate a final output data array of the sequence of operations on a processor operable to execute neural network processing, the sequence are performed for respective blocks of the initial input data array on a block-by-block basis, and when performing an operation in the sequence whose output data is input data for another operation in the sequence, the output data is used as input data for another operation of the sequence is stored in local storage of the processor that is performing the neural network processing, and provided as input data for the another operation in the sequence from the local storage, but for the final operation in the sequence, the final output data array is stored in a main memory of the data processing system.

21 Claims, 10 Drawing Sheets

(56) References Cited

U.S. PATENT DOCUMENTS

| | | | | |
|---|---|---|---|---|
| 2020/0051309 | A1* | 2/2020 | Labbe | G06N 3/08 |
| 2020/0250510 | A1* | 8/2020 | Kumar Addepalli | G06N 3/042 |
| 2021/0125042 | A1* | 4/2021 | Han | G06N 3/063 |
| 2021/0255843 | A1 | 8/2021 | Bequet et al. | |
| 2024/0103912 | A1 | 3/2024 | Etsion et al. | |
| 2024/0168915 | A1 | 5/2024 | Du et al. | |
| 2024/0202003 | A1 | 6/2024 | Chajdas et al. | |

OTHER PUBLICATIONS

Combined Search Report and Examination Report under Sections 17 and 18(3) dated Jul. 20, 2022, GB Patent Application No. GB2114426.6.

Chugh, U., et al., "An Automated approach to accelerate DNNs on Edge Devices", 2019 IEEE International Symposium on Circuits and Systems (ISCAS), 2021, pp. 1-5.

Gondimalla, A., et al., "Occam: Optimal Data Reuse for Convolutional Neural Networks", Cornell University Library 2021, Section I; pp. 1-2; Sections III, A-D; p. 3-p. 7.

Stahl, R., et al., "DeeperThings: Fully Distributed CNN Interence on Resource-Constrained Edge Devices", International Journal of Parallel Programming, vol. 49, No. 4, 2021, pp. 600-624.

Zhao, Z., et al. "DeepThings: Adaptive Deep Learning Interference on Resource-Constrained IoT Edge Cluster", IEEE Transactions on Computer-Aided Design of Integrated Circuits and Systems, vol. 37, No. 11, 2018, pp. 2348-2359.

Examination Report under Section 18(3) dated Jan. 15, 2024, GB Application No. GB2114426.6.

Arxiv.org, Lym, S., et al., "Mini-Batch Serialization: CNN Training With Inter-Layer Data Reuse", 2018, available from https://arxiv.org/pdf/1810.00307,pdf, 12 pages.

Search Report under Section 17 dated Feb. 7, 2025, GB Application No. GB2411941.4, 4 pages.

International Search Report & The Written Opinion of the International Searching Authority dated Oct. 13, 2025, International Application No. PCT/GB2025/051609.

* cited by examiner

METHODS AND SYSTEMS FOR HANDLING OPERATIONS IN SEQUENCE FOR NEURAL NETWORK PROCESSING

CROSS-REFERENCE TO RELATED APPLICATIONS

This application claims priority pursuant to 35 U.S.C. 119(a) to United Kingdom Application No. 2114426.6, filed Oct. 8, 2021, which application is incorporated herein by reference in its entirety.

BACKGROUND

The technology described herein relates to the execution of neural networks on electronic devices.

Neural networks can be used for processes such as machine learning, computer vision and natural language processing operations.

Neural network processing generally comprises a sequence of operations (which may be referred to as "layers" of the neural network processing), which each process an input data array (tensor) to provide an output data array (tensor) (which may become the input data array (tensor) for another operation (layer)). The sequence of operations (layers) may, for example, be able to process complex data (e.g. image or sound data) to ultimately provide a desired output (e.g. an identification of an object within an image, or a spoken word within a sound clip, or other useful output inferred from the input data). This process is usually known as "inferencing" or "classification".

The input data arrays (tensors) which are processed by operations (layers) during neural network processing are commonly referred to as "input feature maps". Likewise, the output data arrays (tensors) generated from input data arrays (tensors) by operations (layers) during neural network processing may be referred to as "output feature maps". The input/output data arrays (feature maps) (tensors) will typically comprise (one or multi-dimensional) arrays of data (tensors) which are or are derived from (representative of) part of, or the entirety of, data initially provided to the neural network (e.g. image or sound data) and that is to be processed by the neural network.

The operations which process input data arrays to generate output data arrays in neural networks can comprise various different types of operations, such as convolution operations, activation operations, pooling operations, elementwise operations, resize operations, etc.

As well as the necessary input feature maps, various other sets of data and parameters may be used for and when performing neural network processing operations (e.g. when generating an output feature map from an input feature map).

For example, many operations performed by layers of a neural network involve applying a set of so-called "weights" (also termed "a filter") to an input feature map (an input data array), to thereby generate a corresponding output feature map (an output data array). The set of weights (filter) may comprise an array of weight data. Each weight value may be determined, for example, during training of the neural network.

The input data arrays (and corresponding output data arrays), and other data required for neural network processing (such as weight data) may comprise relatively large amounts of data, and so neural network processing can often require and consume relatively large amounts of memory bandwidth.

The Applicants believe that there remains scope for improvements to neural network processing and to systems which perform neural network processing, for example to improve utilisation of memory bandwidth and to increase the efficiency of neural network processing.

BRIEF DESCRIPTION OF THE DRAWINGS

A number of embodiments of the technology described herein will now be described by way of example only and with reference to the accompanying drawings, in which.

Like reference numerals are used for like features in the drawings, where appropriate.

DETAILED DESCRIPTION

Figure 1:
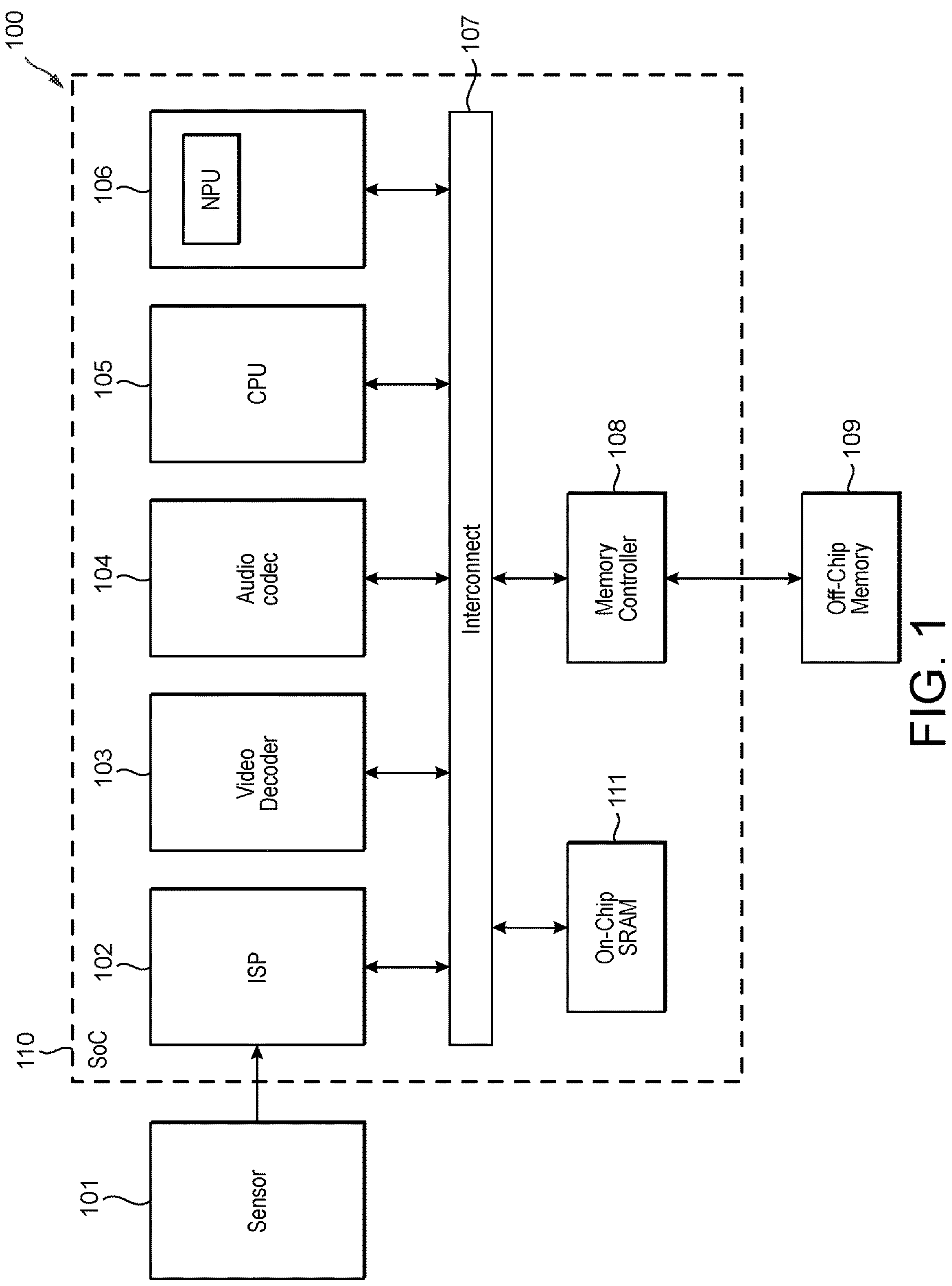
FIG. 1 shows schematically a data processing system which may be configured to perform neural network processing in the manner of the technology described herein.

A first embodiment, the technology described herein comprises a method of operating a data processing system, the data processing system comprising a main memory operable to store data for neural network processing, and a processor operable to execute neural network processing, the processor operable to execute neural network processing having an associated local storage operable to store data for neural network processing when the processor is performing neural network processing, the method comprising:

performing neural network processing comprising a sequence of operations to process an initial input data array for the sequence of operations to generate a final output data array of the sequence of operations for respective blocks of the initial input data array on a block-by-block basis, such that the initial input data array is processed as one or more blocks which are each processed independently according to the sequence of operations to generate a corresponding block of the final output data array;

wherein:

at least one of the operations in the sequence of operations uses output data from a previous operation in the sequence of operations as input data; and performing the neural network processing comprising the sequence of operations for a block of the initial input data array comprises:

i. performing the operations of the sequence of operations one after another for the block of the initial input data array to generate a block of the final output data array; and ii. when performing an operation in the sequence of operations whose output data is to be used as input data for another operation in the sequence of operations, storing the output data which is to be used as input data for another operation of the sequence of operations in the local storage of the processor that is performing the neural network processing, and providing the output data as input data for the another operation in the sequence of operations from the local storage; and iii. for the final operation in the sequence of operations, storing output data generated by the final operation corresponding to a block of the final output data array in the main memory.

A second embodiment of the technology described herein comprises a data processing system, the data processing system comprising:

a main memory operable to store data for neural network processing; and a processor operable to execute neural network processing, the processor operable to execute neural network processing having an associated local storage operable to store data for neural network processing when the processor is performing neural network processing;

the processor further comprising a processing circuit configured to:

cause the processor to perform neural network processing comprising a sequence of operations to process an initial input data array for the sequence of operations to generate a final output data array of the sequence of operations for respective blocks of the initial input data array on a block-by-block basis, such that the initial input data array is processed as one or more blocks which are each processed independently according to the sequence of operations to generate a corresponding block of the final output data array;

i. wherein:

ii. at least one of the operations in the sequence of operations uses output data from a previous operation in the sequence of operations as input data;

and cause the processor to perform the neural network processing comprising the sequence of operations for a block of an initial input data array by:

i. performing the operations of the sequence of operations one after another for the block of the initial input data array to generate a block of the final output data array;

and to:

i. when performing an operation in the sequence of operations whose output data is to be used as input data for another operation in the sequence of operations, store the output data which is to be used as input data for another operation of the sequence of operations in the local storage of the processor that is performing the neural network processing, and retrieve the output data for use as input data for the another operation in the sequence of operations from the local storage;

and to:

i. for the final operation in the sequence of operations, store output data generated by the final operation corresponding to a block of the final output data array in the main memory.

The technology described herein relates to neural network processing, and in particular to the performing of a sequence of operations (a sequence of layers of neural network processing) when performing neural network processing. In the technology described herein, a sequence of operations for neural network processing is performed on a block-by-block basis, i.e. such that the initial input data array to the sequence of operations is processed (is subjected to the sequence of operations) on a block-by-block basis.

The Applicants have recognised in this regard that sequences of operations for neural network processing can (often) be performed on a block-by-block basis (rather than having to process the entire initial input data array as a whole before starting a next operation (layer) in the sequence of neural network processing), and such that a sequence of operations being performed for a block of an input data array can, in effect, be "chained" together so as to be performed as a sequence together for a given block of an initial input data array to thereby generate a corresponding block for the output data array that is the output of the sequence of "chained" operations.

The Applicants have further recognised in this regard that by performing sequences (chains) of operations for neural network processing for respective blocks of an initial input data array independently and separately to each other, the amount of output data that may be required to be transferred from one operation in the sequence (chain) to act as input data for a next operation in the sequence (chain) can correspondingly be controlled and reduced, as compared to if having to transfer the entirety of the data array output by one operation (layer) to the next operation (layer) in the sequence as a whole.

Accordingly, the amount of data that needs to be stored for "transferring" from one operation (layer) in the sequence to a next operation (layer) in the sequence can be reduced, and in particular, can be reduced to an amount that can be handled and stored locally within the processor that is performing the neural network processing, without the need to transfer data generated as an output by one operation (layer) in the sequence of operations out to main memory before then returning that data from the main memory to the next operation (layer) in the sequence of operations as input data (and without the need to provide extensive additional local storage for the processor that is performing the neural network processing).

The technology described herein exploits this by performing sequences of operations for neural network processing on a block-by-block basis, and by, when performing a sequence of operations for a block of an initial input array and an operation in the sequence of operations is generating output data that is to be used as input data for another operation in the sequence of operations, storing the output data which is to be used as input data for the another operation in the sequence of operations in local storage of the processor that is performing the neural network processing, and then providing that data as input data for the another operation in the sequence of operations from that local storage. This then avoids having to write out data from an operation that will be used as an input for another operation in the sequence of operations to the main memory, thereby reducing the memory bandwidth associated with and required by the neural network processing.

In other words, by performing sequences (chains) of neural network processing operations for respective blocks of an input data array individually, and storing data that needs to be transferred from one operation in the sequence (chain) to another operation in the sequence (chain) locally to the processor that is performing the neural network processing, the memory bandwidth required for performing the neural network processing can be reduced (by reducing the number of times that operations in the sequence (chain) have to write data to (and read data from) the main memory when performing the neural network processing.

Accordingly, in embodiments the technology described herein provides a method and system for performing neural network processing operations that consumes relatively lower memory bandwidth for writing data to (and reading data from) main memory (and without the need for alternatively providing extensive local storage for neural network data instead).

The data processing system of the technology described herein may be implemented as part of any suitable electronic device which may be required to perform neural network processing, e.g., such as a desktop computer, a portable electronic device (e.g. a tablet or mobile phone), or other electronic device. Thus the technology described herein also extends to an electronic device that includes the data processing system of the technology described herein (and on which the data processing system operates in the manner of the technology described herein). The data processing system of the present may, in an embodiment, be implemented as part of a portable electronic device (such as a mobile phone, tablet, or other portable device).

The data processing system may comprise any desired components and elements that a data processing system can comprise, such as one or more or all of: a display processing unit (display processor), a central processing unit (CPU), a graphics processing unit (GPU) (graphics processor), a video processor, a digital signal processor, one or more neural network processors (NPU), a display and a memory.

The processors may be arranged within a system-on-chip system.

Correspondingly, the processor that executes the neural network may comprise any suitable processor that is capable of doing that, such as a central processing unit (CPU), a graphics processing unit (GPU) (graphics processor), a video processor, a sound processor, an image signal processor (ISP), a digital signal processor, and a Neural Network Accelerator/Processor (NNA/NPU).

The processor that executes the neural network should, and in an embodiment does, include appropriate processing circuits, logic, etc., suitable for performing neural network processing operations.

Thus the processor that executes the neural network in an embodiment comprises, inter alia, processing circuit(s) configured to apply a filter to an input data array and in an embodiment to perform a weighted sum using input data and weight data. In an embodiment, the processor comprises appropriate circuit(s) for performing the weighted sum. In an embodiment, the processor is configured to perform a weighted sum as a multiply-accumulate operation, and accordingly the processor comprises one or more multiply-accumulate circuits (otherwise known as a multiplier-accumulator, or an "MAC unit") and/or one or more dot product units (circuits) (DPUs) for performing, inter alia, multiply-accumulate operations. In an embodiment the MAC unit is also operable to perform, and used to perform, other (potentially non-elementwise) operations, such as pooling and/or min/max reductions.

The processor that performs the neural network processing in an embodiment also or instead, and in an embodiment also, comprises processing circuit(s) configured to perform elementwise operations for neural network processing. This circuit is in an embodiment in the form of an activation output (AO) circuit (unit).

The processor may, of course, include other circuits, units, etc., as desired.

The main memory that is operable to and used to store data for neural network processing in the technology described herein can be any suitable and desired (main) memory of the data processing system (that is suitable, and used for, inter alia, for storing data, inter alia, relating to neural network processing).

The main memory that is used in the technology described herein should be, and is in an embodiment, memory that is external to the processor that is performing the neural network processing. It should be, and is in an embodiment, memory that is accessed from and by the processor that is performing the neural network processing via a (its) bus interface.

The main memory of the data processing system is correspondingly in an embodiment memory that is accessed by the processor that is performing the neural network processing via an appropriate memory access unit or units, and in an embodiment via one or more direct memory access (DMA) units. Thus the processor which is to perform the neural network processing in an embodiment has associated with it (and in an embodiment comprises) one or more direct memory access (DMA) units (via which it can and will access data in the main memory).

The main memory may be any suitable type of memory. The main memory in an embodiment comprises random access memory (RAM), e.g. such as SRAM, DRAM, and/or SDRAM.

The main memory may, and in an embodiment does, comprise several actual (physical) memories (i.e. may be distributed across several different "memories" within the overall data processing system), and can comprise both on-chip and/or off-chip memory (and in an embodiment comprises both on- and off-chip memory).

In an embodiment, at least part of the main memory that is used in the technology described herein is on-chip with the processor that is performing the neural network processing (which on-chip memory will accordingly be faster to access and lower power than off-chip). (It should be noted here that even for on-chip "main" memory, there will still be a bandwidth limitation caused by the bus interface, and accesses to that on-chip memory will still use more power than using the local storage of the processor that is performing the neural network processing.) In an embodiment, the main memory comprises, at least in part, on-chip SRAM.

The local storage associated with the processor that is to perform the neural network processing can comprise any suitable and desired local storage of that processor. The local storage should be, and is in an embodiment, physically (and logically) separate from the main memory. The local storage should be, and is in an embodiment, storage that is internal to the processor that is performing the neural network processing and/or can in an embodiment be accessed by processing unit(s) of the processor directly (without the need for a memory access unit (e.g. DMA) and not via any bus interface (to the main memory) (in contrast to the main memory)).

In an embodiment, the local storage that is used in the technology described herein is storage that can be written to and read from directly by an activation output circuit (unit) of the processor that is performing the neural network processing (which activation output (AO) circuit (unit) is in an embodiment configured to at least perform elementwise operations for neural network processing).

In this case, and generally, the local storage is in an embodiment configured to and used for storing the results of elementwise operations, and for transferring data between such operations in a sequence of operations being performed in the manner of the technology described herein.

The local storage in an embodiment comprises an appropriate buffer or buffers of or accessible to the processor, in which the data for the neural network processing when performing neural network processing in the manner of the technology described herein can be stored. In an embodiment it is in the form of an internal streaming buffer, and in an embodiment uses a FIFO scheme (e.g. comprises one or more FIFO, first in, first out units).

In an embodiment there is a single local storage (a "chaining" buffer) that is used for storing and providing data as input data between operations in a sequence of operations being performed in the manner of the technology described herein. Thus in an embodiment, the same buffer (a chaining buffer) is used for storing and providing data as input data between operations (from one operation to another) in a sequence of operations being performed in the manner of the technology described herein.

Thus, in an embodiment, all outputs from operations in the sequence of operations that are to be used as an input for a subsequent operation in the sequence of operations will be stored in the single, local storage, chaining buffer, to be (and be) provided therefrom as an input to another (a subsequent) operation in the sequence of operations.

It would be possible in this regard for a given output from an operation in the sequence of operations to be transferred to the chaining buffer so that it can be used therefrom as an input for a subsequent operation in the sequence of operations, where the output from the operation is not directly written to the local storage, chaining buffer (and in an embodiment, this is what is done).

For example, the processor may, and in an embodiment does, include an accumulator buffer, for storing locally the results of, e.g. multiply-accumulate, operations (e.g. as part of a convolution operation of neural network processing), performed by a MAC circuit (unit) of the processor. The accumulator buffer should be and is in an embodiment memory internal to the processor that is performing the neural network processing and which can be written directly by an (the) multiply-accumulate (MAC) circuit (unit) of the processor, and read directly by an (the) activation output (AO) circuit (unit) of the processor that is performing the neural network processing. The accumulator buffer in an embodiment stores unscaled "accumulation" blocks, but is read by the AO unit in smaller sub-blocks.

In this case, the results of the, e.g. multiply-accumulate, operations will in an embodiment be, and are in an embodiment, stored in the accumulator buffer, but when the result of a, e.g. multiply-accumulate, operation that is stored in the accumulator buffer is to be used as an input for an operation of a sequence of operations in the manner of the technology described herein, the data from the accumulator buffer is in an embodiment first transferred to the local storage (the chaining buffer) for the sequence of operations from the accumulator buffer, and then used from the local storage, chaining buffer as an input to a next operation in the sequence of operations, as appropriate.

Thus in an embodiment, data is transferred from another local storage (e.g. an accumulator buffer) of the processor that is performing the neural network processing to the local storage, chaining buffer, that is to be used to store data and for transferring data when performing a sequence of operations in the manner of the technology described herein.

The data may be transferred from the, e.g. accumulator buffer, to the local storage (the chaining buffer) for the sequence of operations in any suitable and desired manner. In an embodiment, this is done by an activation output (AO) circuit (unit) of the processor that is performing the neural network processing reading the data from the accumulator buffer (in an elementwise fashion) and storing the data in the local storage, chaining buffer for use therefrom as an input to a subsequent operation in the sequence of operations. In this case, the data read from the, e.g. accumulator buffer, may be, and is in an embodiment, subjected to an operation, e.g. and in an embodiment an elementwise operation, such as a scaling operation, e.g. and in an embodiment, by the activation output (AO) unit, as it is read from the, e.g., accumulator buffer, before it is stored in the local storage, chaining buffer.

The data is in an embodiment transferred from the, e.g. accumulator buffer, to the local storage, chaining buffer (whether it is subject to an elementwise operation or not) directly (not via the main memory).

In an embodiment, it is only data from the first operation in a sequence of operations that may be transferred to the local storage, chaining buffer from another buffer, e.g. the accumulator buffer. In an embodiment all subsequent operations in the sequence of operations simply use the local storage, chaining buffer (i.e. the output from the operation is stored directly in the local storage, chaining buffer and then read therefrom as an input, without passing through any other buffer or local storage of the processor that is performing the neural network processing).

In a such embodiment, the data stored in the accumulator buffer is first subjected to an (in an embodiment elementwise) scaling operation (as the accumulator buffer in an embodiment stores the unscaled results of the multiply-accumulate operations), with the scaled multiply-accumulate results then being stored in the local storage, chaining buffer for the sequence of operations, and used as an input to a subsequent (the next) operation in the sequence of operations.

In an embodiment, where the, e.g. multiply-accumulate operation (the MAC unit) operates on blocks of input data arrays and stores resulting blocks of an output from the, e.g. multiply-accumulate operation, the block size output by the, e.g. multiply-accumulate operation of the, MAC (unit) is larger than the block size that the chained sequence of operations will operate on. Thus in an embodiment, the, e.g. accumulator buffer, is logically written in blocks of a first size, but read and transferred to the local storage, chaining buffer (and processed from the local storage, chaining buffer), in sub-blocks of a smaller size.

(It would also be possible to use two (or more) local storages (buffers) for storing and transferring data between operations in a sequence of operations in the manner of the technology described herein, if desired.)

In an embodiment the local storage chaining buffer of the processor that is performing the neural network processing can store data that is loaded therein from the main memory (in an embodiment via and using one or more DMA units of the processor), in addition to data loaded by the activation output unit (e.g.), and/or data of elementwise operations, when executing a sequence of operations in the manner of the technology described herein. Thus, in an embodiment, the processor that is performing the neural network processing is also configured and operable to be able to store data from the main memory in the local storage, chaining buffer that is used to store and transfer data between operations in a sequence of operations in the manner of the technology described herein.

Correspondingly, in an embodiment the local storage, chaining buffer includes capacity (and in an embodiment has set aside capacity) for storing (intermediate) data between (e.g. elementwise) operations in a sequence of operations when the processor is performing neural network processing in the manner of the technology described herein, and capacity (storage) set aside for (allocated for) storing data, such as, and in an embodiment, input feature map data, from main memory.

In an embodiment, the local storage chaining buffer includes a set of plural storage "slots", each of which is configured to, and usable to, store a particular set of data for use for neural network processing, such as data of an output feature map block from an operation in a sequence of operations that is being performed in the manner of the technology described herein, or data of an input feature map block loaded from main memory.

In an embodiment, some, and in an embodiment plural, of the slots of the local storage chaining buffer are used for, and in an embodiment set aside for, storing data from the main memory, and others, and in an embodiment plural others of, of the slots are used for, and in an embodiment are set aside for (dedicated to), storing (intermediate) data for a block between operations in a sequence of operations that is being performed in the manner of the technology described herein.

Each slot may have, for example, a particular amount of storage capacity associated with it for use for storing a set of data for a block for/from a neural network processing operation.

Each storage slot of the local storage chaining buffer in an embodiment has an identifier (which is in an embodiment unique within the local storage), so as to identify that slot of the local storage chaining buffer. In this case all the slots may use (different ones of) the same set of identifiers, or there could be one set of identifiers for slots allocated for data from the main memory, and one set of identifiers allocated to slots for storing (intermediate) data between operations in a sequence of operations.

As well as the local storage that is used for storing and transferring data between operations in a sequence of operations in the manner of the technology described herein, the processor that is performing the neural network processing may, and in an embodiment does, have other local storage, for storing other data that may be used for or produced by the neural network processing.

For example, the processor may, and in an embodiment does, also include an output buffer for storing locally data that is to be written out to the main memory. It may also include local storage for storing weights to be used for the neural network processing and/or local storage for storing commands (instructions) indicating neural network processing to be performed.

The various "types" of local storage may be physically distinct from each other, or may be part of the same physical storage, but, e.g., and in an embodiment, logically separate therein.

The technology described herein may be used for and in conjunction with any suitable and desired neural network and neural network processing.

The overall neural network that the operation in the manner of the technology described herein is used with will, as will be appreciated by those skilled in the art, comprise a sequence of neural network processing operations (layers). The overall neural network may comprise any suitable and desired number and types of layers, such as convolution layers, activation layers, pooling layers, etc.

The overall neural network will take as an input an overall input data array and process that overall input data array through the sequence of neural network processing operations (layers) to provide an overall output data array of the overall neural network. For example, the neural network may operate to identify and/or classify features present within the overall input data array.

The overall input data array to the overall neural network may be any suitable array of input data, such as comprising an image or a sound file. The overall input data array will comprise a one or multi-dimensional, e.g. a two or three (or higher) dimensional, array of (plural) data elements (positions), each data element (position) having one or more data values associated therewith. The overall input data array is in an embodiment a two dimensional or three dimensional array.

As discussed above, the technology described herein relates in particular to the performing of a sequence of neural network operations (layers) of a neural network.

It should be noted here that references to neural network operations (layers) and a sequence of neural network operations (layers) of a neural network are intended to refer to independently specified neural network operations (layers) of a neural network e.g., and in an embodiment, that can be specified as such (as a single operation) by the user (such as "multiply-accumulate" or "scaled convolution") (as compared to the situation where such independently (user) specified operations may be broken down internally for the processor that is performing the neural network processing into sub-operations as part of the implementation of the specified neural network operation).

For example, a specified "scaled convolution" operation may be broken down internally into a convolution followed by a scaling operation. Unless the context requires otherwise, references to a neural network operation (layer) herein refer in this case to the overall "scaled convolution" operation, rather than any respective sub-operations that the scaled convolution may be divided into for implementation purposes.

The particular sequence of neural network operations that are performed in the manner of the technology described herein may comprise the entirety of the neural network processing to be performed (for the neural network in question), but as will be discussed further below, more typically, and in an embodiment, comprises only a subset of the operations (layers) for the overall neural network in question. Thus the operation in the manner of the technology described herein is in an embodiment performed for, and is in an embodiment being performed for, only part of (but not all of) the overall neural network that is being executed.

It would be possible to perform neural network processing in the manner of the technology described herein for plural respective parts of (sequences of operations of) an overall neural network that is being executed. Thus, in an embodiment, the operation in the manner of the technology described herein is performed for one or more, and in an embodiment for plural, respective (different) sequences of operations of an overall neural network that is being executed.

In this case, a first sequence of operations of the overall neural network that is being executed may be performed in the manner of the technology described herein, with a second (and, e.g., subsequent), different sequence of operations for the overall neural network then also being performed in the manner of the technology described herein (and independently of the first sequence of operations) (and so on, for other sequences of operations of the overall neural network), where desired and as appropriate.

Correspondingly, there may be one or more other operations (layers) of the overall neural network in addition to the particular sequence(s) of operations (layers) that is or are being executed in the manner of the technology described herein that are not performed in the manner of the technology described herein (and that accordingly, and in an embodiment, are performed as their own, separate, operations (layers)).

Thus the execution of an overall neural network may comprise performing one or more sequences of operations (layers) of the overall network in the manner of the technology described herein, potentially together with performing one or more operations (layers) for the overall neural network not in the manner of the technology described herein (e.g., and in an embodiment, in the normal manner for such operations (layers) when performing neural network processing).

A sequence of operations that is being performed in the manner of the technology described herein may include the first operation (layer) in the overall neural network that is being executed, but may equally not (may other than) comprise the first operation (layer) in the overall neural network that is being executed, but start with an "intermediate" operation (layer) in the overall sequence of operations (layers) of the overall neural network. Thus, in an embodiment, the first operation in the sequence of operations that is being performed in the manner of the technology described herein comprises an intermediate operation (layer) in the overall sequence of operations (layers) of the overall network (and does not comprise the first operation in the overall sequence of operations (layers) of the overall neural network).

Thus the initial input data array for the sequence of operations to be performed in the manner of the technology described herein will typically, and in an embodiment does, comprise an input data array for an intermediate operation (layer) in the overall sequence of operations (layers) of the overall neural network, such as an output feature map from a preceding operation (layer) of the neural network (and need not be, and typically will not be, the overall initial input data array to the overall neural network that is being executed (although it could be if the sequence of operations includes the first operation (layer) of the overall neural network)).

(Accordingly, references to the initial input data array for the sequence of operations that will be performed in the manner of the technology described herein refer to the initial input data array to the particular sequence of operations in question (and not necessarily to the overall initial input data array for the overall neural network).)

Correspondingly, while the final operation that is being performed in a sequence of operations that is being performed in the manner of the technology described herein could be the overall final operation (layer) of the overall neural network, again that need not be (can be other than) the case, and the final operation in the sequence of operations that is being performed in the manner of the technology described herein may, and in an embodiment does, comprise an intermediate operation (layer) in the overall sequence of operations (layers) of the overall neural network.

Thus the output data of the final operation in the sequence of operations being performed in the manner of the technology described herein will typically, and in an embodiment does, comprise output data for the output data array (output feature map) for an intermediate operation (layer) in the overall sequence of operations (layers) of the overall neural network, such as, and in an embodiment, data of an output feature map from that intermediate operation (layer) of the neural network (and need not be, and typically will not be, data of the overall output data array of the overall neural network that is being executed (although it could be if the sequence of operations finishes with the final operation (layer) of the overall neural network)).

(Accordingly, references to the final operation in the sequence of operations and to the output data generated by the final operation in the sequence of operations that is being performed in the manner of the technology described herein refers to the final operation and output data of the particular sequence of operations in question (and not necessarily or solely to the overall final operation (layer) of the overall neural network and the overall output data array for the overall neural network).)

In an embodiment, the initial input data array for the sequence of operations that is being performed in the manner of the technology described herein comprises an input data array which is stored in the main memory, and which will therefore be loaded from the main memory for the sequence of operations (layers) that are being performed. It may, and in an embodiment does, comprise an output feature map that has been generated by a previous operation (layer) of the neural network processing (e.g. of the immediately preceding layer) and stored in the main memory.

Thus, in an embodiment, the method of the technology described herein comprises, and the processor is caused/configured to, loading data of the initial input data array for the sequence of operations from main memory (e.g., and in an embodiment, via a DMA unit), for processing by the first operation of the sequence of operations. In this case, the data of the initial input data array for the sequence of operations could be loaded and processed directly from the main memory, or it could first be loaded into appropriate local storage (e.g. the chaining buffer) of the processor and processed therefrom, as desired and as appropriate.

The initial input data array for the sequence of operations may comprise an entire input data array (e.g. input feature map), e.g. which is stored in memory and which is to be processed according to the sequence of operations. Alternatively, the initial input data array for the sequence of operations may comprise (only) part of an overall initial input data array for the sequence of operations (e.g. which is stored in memory), e.g. where an overall initial input data array is processed as a plurality of portions (tiles) making up the overall initial input data array. In this case, each portion (tile) of the overall initial input data array (feature map) is in an embodiment respectively processed in the manner of the technology described herein.

Thus, the initial input data array for the sequence of operations may comprise a block of a larger input data array (the larger input data array corresponding to, for example, an entire input feature map to be processed by the first operation (layer) of the sequence of operations), with the overall larger input data array then being divided into and processed as an appropriate number of smaller portions of that overall input data array (in the manner of the technology described herein).

The sequence of neural network processing operations (layers) that is performed in the manner of the technology described herein can comprise any suitable and desired sequence of neural network processing operations (layers). Each operation will be, and is in an embodiment, an operation that processes one or more input feature maps to produce an output feature map.

The sequence of neural network processing operations will comprise at least one operation for which the output of that operation is used as an input for a (the) next operation in the sequence of operations. In an embodiment, plural, and in an embodiment each, operations in the sequence of operations after the first operation uses as an input the output from the previous operation in the sequence. In an embodiment the sequence of operations is such that for each operation in the sequence of operations apart from the final operation in the sequence of operations, the output of that operation is only used by, and only required as an input for, a (the) next operation in the sequence of operations (i.e. such that the outputs of all except the last operation in the sequence of operations are outputs that are only required and used "internally" within the sequence of operations itself).

In an embodiment, the first operation in the sequence of operations is a more complex operation, with the subsequent operations in the sequence of operations being different and simpler operations. In an embodiment the subsequent operations after the first operation can all be performed and follow a particular, consistent, data processing order (such that they can be performed as a sequence of operations one after another and independently of each other), with the first operation then, e.g., and in an embodiment, defining the order in which the data will be processed by the subsequent operations. Thus in an embodiment, the first operation in the sequence of operations sets (defines) the order that the data will be processed over the sequence of operations (the data processing ordering), with the subsequent operations in the sequence of operations then following that data processing ordering established by the first operation in the sequence of operations (the subsequent operations in the sequence are, e.g. and in an embodiment, simpler, operations that can be executed and run in the data processing order (block/sub-block order) determined by the first operation).

It will be appreciated in this regard that operations (layer) for neural network processing may perform so-called "elementwise" operations, in which one data element in the input data array to the operation is subjected to an operation on its own (independently of any other data positions in the input data array), to provide a corresponding output data element in an output data array (e.g. such that there is a one-to-one mapping between an input data element and an output data element). Such elementwise operations may comprise, for example, addition, subtraction, multiplication or division of the data elements in the input data array.

There may also be neural network processing operations (layers) that are not "elementwise" (that are non-elementwise), i.e. in which the output of a given location (position) depends on a region of the input and not just the input(s) at the same position (location). An example of such a non-elementwise (across-tensor) operation would be a convolution operation (a convolution layer), which operates to apply (convolve) a weight data array (a "filter") with a plurality of data elements in the input data array to generate a particular data element (data position) for the output data array. In this case, a plurality of input data elements may, for example, be multiplied with a respective set of weight values (a filter), with the results of the filtering then being combined (e.g. summed) to provide the data value for a single data element (position) in the output data array. Another example of a non-elementwise operation would be a pooling operation.

In this case therefore, rather than there being a one-to-one mapping between data elements in the input data array and the output data array, a plurality of data elements in the input data array may be used to generate a single output data array element. Thus in this case, the data value of a single element (position) in the output data array will be based on plural data elements (positions) in the input data array, and so the operation will not be an "elementwise" operation.

In an embodiment, the first operation in the sequence of operations that is performed in the manner of the technology described herein comprises either an elementwise or a non-elementwise (e.g. a convolution) operation. Thus in one embodiment the first operation in the sequence of operations comprises an elementwise operation, and in another embodiment, the first operation in the sequence of operations comprises a non-elementwise operation, such as, and in an embodiment, a convolution or pooling operation.

In an embodiment, all the operations in the sequence of operations that is performed in the manner of the technology described herein after the first operation in the sequence comprise elementwise operations (e.g. addition, subtraction, division, multiplication). Thus, in an embodiment, any subsequent operations after the first operation in the sequence of operations comprise elementwise operations.

The Applicants have recognised in this regard that restricting the subsequent operations in the sequence of operations to be elementwise operations essentially constrains and fixes the sizes of the block's output feature maps (at least in terms of the number of data elements) that will be produced by each such operation to all be the same as each other (as if the operation is an elementwise operation, the output feature map block from the elementwise operation will have the same number of data elements as the input feature map block to the elementwise operation). This then facilitates using (streaming) local storage for storing blocks of output feature maps from the operations in the sequence of operations for use as blocks of input feature maps for subsequent operations in the sequence of operations, as it will be known and can be predicted how large the output feature map blocks that need to be stored from each elementwise operation will be (and the size of those output feature map blocks to be stored in the local storage will be constant (at least in terms of the number of data elements)), and each data element will be processed on its own, and in turn, thereby facilitating a streaming operation for the local storage.

This therefore facilitates storing blocks of output feature maps from one operation in the sequence of operations for use as an input feature map block for the next operation in the sequence of operations in local storage and can provide, for example, predictable and known usage and capacity requirements for the local storage.

Constraining the subsequent operations in the sequence of operations to be elementwise operations also ensures that those operations will operate on blocks of the initial input data array in a guaranteed sequence of those blocks, and such that, for example, the operations will not need to use overlapping, or parts of, blocks that have been processed in a previous operation.

Thus, in an embodiment, the first operation of the sequence of operations that is performed in the manner of the technology described herein comprises an elementwise or a non-elementwise operation, but the remaining operations in the sequence comprise elementwise operations. Correspondingly, in an embodiment, the first operation in the sequence of operations comprises a convolution or pooling operation, and the remaining operations in the sequence of operations comprise elementwise operations.

It would be possible for the sequence of operations that is performed in the manner of the technology described herein to comprise any suitable and desired number of operations. However, in an embodiment, the number of operations in the sequence of operations is constrained to be no more than a particular, in an embodiment selected, in an embodiment predetermined, maximum number of operations. Thus there is in an embodiment a maximum permitted number of operations that any sequence of operations that is performed in the manner of the technology described herein can comprise. In an embodiment, the maximum number of operations that a sequence of operations that is performed in the manner of the technology described herein can comprise is four. Other maximum numbers would be possible, if desired.

Constraining the number of operations in the sequence of operations to be no more than a maximum permitted number of operations helps to ensure that any data for the operations can be stored and handled via the local storage (and without the need to provide an excessive amount of local storage).

Thus, in an embodiment, the maximum number of operations that can be in a sequence (chain) is set and selected based on the capacity of the local storage that will be used to store data locally for the sequence of operations.

Thus, and in particular in the case where the local storage includes a number of slots for storing (blocks of) output feature maps from operations in a sequence of operations, the maximum number of operations that there can be in a sequence of operations is in an embodiment (at least) based on the maximum number of (blocks of) output feature maps from operations that can be stored in the local storage.

In an embodiment, there is also a particular, in an embodiment selected, in an embodiment predetermined, limit on the number of different input feature maps that can be loaded from the main memory for the sequence of operations. Thus, there is in an embodiment a maximum number of different input feature maps that can be loaded from the main memory that is permitted for a given sequence of operations that will be performed in the manner of the technology described herein. This may be, and is in an embodiment, based on the number of hardware DMA channels that are supported (and correspondingly is imposed so as to limit the number of hardware DMA channels that will be required).

In an embodiment, the maximum number of input feature maps to be loaded from main memory that can be used for a given sequence of operations is four. Again, other maximum values would be possible, if desired.

The number of operations in the sequence of operations is in an embodiment correspondingly constrained based on the number of input feature maps that will be required from main memory for the sequence of operations (and, accordingly, such that the number of input feature maps that will be required from main memory for the sequence of operations is not greater than the maximum permitted number of such input feature maps for a sequence of operations).

Thus the local storage in an embodiment has a capacity sufficient to store input data for a particular, in an embodiment selected, in an embodiment predetermined, maximum number of operations, such as for up to (and including) four operations. Correspondingly, a sequence of operations is in an embodiment constrained so as not to include more operations than the maximum number of operations for which input data can be stored in the local storage.

In an embodiment, there is also a limit on the number of (blocks of) output feature maps from the sequence of operations that are to be output to the main memory. In an embodiment, the sequence of operations is so as to generate one final output data array (output feature map) which is then output to the main memory.

In the technology described herein, the sequence of operations is performed for respective blocks of the initial input data array for the sequence of operations, on a block-by-block basis. In other words, the initial input data array for the sequence of operations is divided into one or more, and in an embodiment a plurality of, blocks, with each block then being processed through the sequence of operations independently of any other block to generate a corresponding block (for the block that is being processed) of the overall final output data array of the sequence of operations.

The individual blocks should be, and are in an embodiment, passed through the entire sequence of operations independently of any other blocks. In one embodiment, each block is started through the entire sequence of operations in turn (one after another).

Alternatively, different blocks could be processed independently, but in parallel, for example where the processor that is executing the neural network supports that.

The initial input data array may be divided into, and processed as, any suitable and desired number of blocks. This may, and in an embodiment does, depend upon the capacity for storing data for a block that is being processed provided by the local storage of the processor. Thus where, for example, the initial input data array for the sequence of operations is of a size such that the local storage can handle and store all of the required data for the sequence of operations in the manner of the technology described herein, the initial input data array may be processed in the manner of the technology described herein as a single block.

On the other hand, if the data that will be needed for and generated by the sequence of operations if processing the initial input data array as a whole is larger than can be handled solely within the local storage, then the initial input data array should be, and is in an embodiment, processed as a plurality of blocks, with each block comprising some but not all (a part of) the initial input data array, and (in an embodiment) being appropriately sized such that the size of the data required to be stored in the local storage when processing the block in the manner of the technology described herein will fit within the capacity of the local storage of the processor provided for that purpose.

Thus in an embodiment, the initial input data array for the sequence of operations is processed as a plurality of blocks. Correspondingly, the number of blocks is in an embodiment based on the capacity of the local storage of the processor provided for the operation in the manner of the technology described herein.

Thus, in an embodiment, a first block of the initial input data array for the sequence of operations will be subjected to the sequence of operations to generate a corresponding first block of the final output data array of the sequence of operations, a second, different block of the initial input data array for the sequence of operations will be subjected to the sequence of operations to generate a corresponding second block of the final output data array of the sequence of operations (and so on, where the initial input data array is processed as more than two blocks).

It should be noted in this regard that the processing of the initial input data array to the sequence of operations as respective blocks refers to sub-dividing the initial input data array to the sequence of operations into respective blocks for processing in the manner of the technology described herein. Thus, for example, where the initial input data array comprises a "tile" of an overall larger input data array, the blocks will be blocks of the respective tile that is being processed.

Each block that the initial input data array is divided into when operating in the manner of the technology described herein will, and in an embodiment does, comprise an appropriate, in an embodiment contiguous, set of the data elements of the initial input data array.

The individual blocks that the initial input data array is divided into when operating in the manner of the technology described herein can have any suitable and desired size and configuration (in terms of the number and configuration of the data elements for the block). Again this may be, and is in an embodiment, based on the data capacity of the local storage for a block.

A block may, and in an embodiment does, comprise as many dimensions as the initial input data array. Thus, where the initial input data array is a two dimensional array, the (and each) block in an embodiment comprises an appropriate two dimensional block (sub-set) of the initial input data array. Correspondingly, where the initial input data array is a three dimensional input data array, the (and each) block that the initial input data array is divided into in an embodiment comprises an appropriate three dimensional block of the initial input data array.

Each block that the initial input data array is divided into for the purposes of the technology described herein in an embodiment has the same size and configuration as the other blocks that the initial input data array is divided into.

In one embodiment, the blocks do not overlap with each other (i.e. each block contains completely different data elements of the initial input data array to any of the other blocks). However, it would also be possible for the blocks to have some data elements in common, for example for the blocks to overlap at their boundaries (edges). This may be desirable depending upon the particular neural network processing operations that are being performed.

The blocks that are processed may be the same size (and configuration) for each operation in the sequence of operations, i.e. such that the first operation in the sequence of operations will process a block having a particular size (and configuration), and each subsequent operation in the sequence of operations will also process blocks having that particular size (and configuration). In one embodiment, this is the case.

However, it could also be the case that operations in the sequence of operations process respective sub-blocks of a block of the initial input data array that the initial input data array has been divided into. This may be appropriate where the first operation in the sequence of operations can process a larger block of the initial input data array, but subsequent operations in the sequence of operations can only handle some but not all of that larger block that was processed in the first operation in the sequence of operations (e.g. because of data capacity constraints in the local storage). For example, it may be the case that an initial accumulation operation can handle a given block size of the initial input data array to the sequence of operations, but then the output of that accumulation operation needs to be further subdivided for subsequent, e.g. elementwise, operations in the sequence of operations.

In this case, a block that the initial data array has been divided into will then be divided into plural smaller sub-blocks, with each sub-block then being processed through the subsequent sequence of operations independently of any other sub-blocks to generate a corresponding sub-block (for the block that is being processed) of the overall final output data array of the sequence of operations.

Again, in this case, the sub-blocks could have no data elements in common, or the sub-blocks could have some data elements in common, for example they could overlap at their boundaries (edges), if desired and as appropriate.

In this case, the sub-blocks that a block of the initial input data array is subdivided into can again have any suitable and desired configuration (that is smaller than the block in question). Again, each sub-block is in an embodiment the same size and configuration as the other sub-blocks that the block is subdivided into. In this case, in an embodiment, once a block has been divided into smaller sub-blocks, then in an embodiment each subsequent operation handles those sub-blocks (and sub-blocks having the same size and configuration), although it would be possible if desired to further subdivide a sub-block into even smaller sub-blocks for subsequent processing operations in the sequence, if that was desired and appropriate.

In an embodiment, the first operation in the sequence of operations is done on a block-by-block basis, but then each such block is subdivided into (smaller) sub-blocks for any and all subsequent operations in the sequence of operations.

Thus, in an embodiment, performing the neural network processing comprising the sequence of operations for a block of the initial input data array comprises (and the processor is correspondingly configured and caused to) performing the first operation of the sequence of operations for the block of the initial input data array as a whole, but performing one or more subsequent (and in an embodiment all the subsequent) operations of the sequence of operations on a sub-block-by-sub-block basis, such that the block of the initial input data array is processed through the subsequent operations of the sequence of operations as a plurality of sub-blocks which are each processed independently according to the subsequent sequence of operations to generate a corresponding sub-block of the final output data array block corresponding to the block of the initial input data array.

In this case therefore, the overall initial input data array for the sequence of operations will be, e.g., and in an embodiment, divided into a plurality of respective blocks, with each such block then being subjected independently to the first operation in the sequence of operations, with the output of the first operation in the sequence of operations then being further sub-divided into respective sub-blocks, which are then independently processed according to the remaining operations in the sequence of operations to generate corresponding sub-blocks of the block of the final output data array corresponding to the block of the initial input data array. For example, a block may be (H×W×C) 4×8×64, and each sub-block 1×8×16, data positions.

At least one of the operations in the sequence of operations that is performed in the manner of the technology described herein uses output data from a previous operation in the sequence of operations as input data, and in that case, the output data from the previous operation is stored in the (appropriate) local storage of the processor for use as input data for the operation in the sequence of operations.

It will be appreciated in this regard that any and all of the at least one operations in the sequence of operations that use output data from a previous operation in the sequence of operations as input data will accordingly be an operation that is other than (that is not) the first operation in the sequence of operations (i.e. will be an operation that is after (that is subsequent to) the first operation in the sequence of operations.

While it would be possible in this regard for there to be only some (e.g. only one) but not all of the subsequent operations (after the first operation) in the sequence of operations to use output data from a previous operation in the sequence of operations as input data, in an embodiment, each operation after the first operation in the sequence of operations uses output data from a previous operation in the sequence of operations as input data. Thus, in an embodiment, each subsequent operation after the first operation in the sequence of operations that is being performed in the manner of the technology described herein uses output data from a previous operation in the sequence of operations as input data.

In an embodiment, a (and each) subsequent operation in the sequence of operations uses output data from the immediately preceding operation in the sequence of operations as input data. Thus, for example, and in an embodiment, the second operation in the sequence of operations in an embodiment uses output data from the first operation in the sequence of operations as input data, the third operation (if present) of the sequence of operations that is being performed in the manner of the technology described herein uses output data from the second operation in the sequence of operations as input data (and so on, depending upon the number of operations in the sequence).

In each case where an operation in the sequence of operations uses output data from a (the) previous operation in the sequence of operations as input data, the output data from the previous operation that is to be used as input data for the next operation is stored in the (appropriate) local storage of the processor that is performing the neural network processing and then used from the local storage as input data to the (next) operation in the sequence of operations. In this case therefore, the output data (the output feature map data) from an operation in the sequence of operations will be stored in the local storage for use therefrom then as input data (as input feature map data) for a (the) next operation in the sequence of operations.

It will be appreciated here that the output data from one operation that is to be used as input data for a next operation that is transferred to the next operation via the local storage should be, and is, provided as input data to the next operation solely via the local storage (i.e. without that data passing through or via the main memory (at least for the purpose of providing it as input data for the next operation in the sequence). Thus the output data that is to act as input data for the next operation will be stored, and in an embodiment streamed, directly into the local storage, and read, and in an embodiment streamed, directly from the local storage by the next operation for use as input data.

In an embodiment this (intermediate) data is never written out to the main memory, but instead is simply transferred between the operations via the local storage (and then discarded once it is no longer required). However, it would be possible to also store out (e.g. some) intermediate results, if desired.

The output data that is to be used as input data for another (the next) operation of the sequence of operations will be, and is in an embodiment, stored in the appropriate local storage of the processor that is performing the neural network processing. Thus, as discussed above, it is in an embodiment stored in a "chaining" buffer provided for storing locally the results of elementwise operations (and accessed by an activation output (AO) circuit (unit) of the processor that is performing the neural network processing).

Correspondingly, the data will be read from the appropriate local storage for use as input data for the appropriate next operation in the sequence.

As discussed above, in an embodiment, where the sequence of operations comprises a convolution operation, followed by one or more elementwise operations, the output from the convolution operation will be stored in an accumulator buffer for storing the results of accumulation operations, but then transferred from the accumulator buffer to a "chaining" buffer that is allocated for storing the results of elementwise operations before then being used from the chaining buffer as an input to the first elementwise operation, with the output from the first elementwise operation then being stored in the local storage, "chaining" buffer, and read therefrom as an input for the next elementwise operation (if any), and so on (where there are further elementwise operations).

The data can be stored in and read from the local storage of the processor when operating in the manner of the technology described herein in any suitable and desired manner. For example, it may be stored in the appropriate local storage (buffer) by streaming it directly to that buffer, and then read directly from the buffer as input data for the next operation. The local storage (buffer) in an embodiment acts as a FIFO to facilitate this (and for this purpose). Other arrangements would, of course, be possible.

The first operation in the sequence of operations that is performed in the manner of the technology described herein will, and in an embodiment does, use as an input, data (e.g. of an input feature map or maps) stored in the main memory (and accessed therefrom via the DMA unit, for example). This input data may be an output of a previous operation (layer) of the neural network that has been written to the main memory. The first operation in the sequence may use a single input feature map from the memory or plural (e.g. two) input feature maps from the main memory, depending upon the nature of the first operation (e.g. whether it is a convolution operation, an elementwise operation, etc.). It may also use a filter (a set of weights), etc., as desired (e.g. in the case of a convolution operation).

The subsequent operations (after the first operation) in the sequence of operations will then, as discussed above, in an embodiment use as an input, at least data output from a (the) previous operation in the sequence of operations (that is transferred between the operations via the appropriate local storage).

A subsequent operation (after the first operation) in the sequence of operations may use as an input data output from a single previous operation in the sequence of operations, or it may use as input, data input from two or more (e.g. two) previous operations in the sequence of operations, as desired.

Correspondingly, a subsequent operation may simply use as an input, data output from (one or more) previous operations in the sequence of operations or it could use as an input both data output from a previous operation or operations in the sequence of operations, and other data that is not an output from a previous operation in the sequence of operations. In general, a subsequent operation can use either only output data from a previous operation or operations, or a combination of output data from a previous operation or operations together with other data that is not an output from a previous operation in the sequence of operations.

Thus, in an embodiment, as well as a subsequent operation (after the first operation) in the sequence of operations using output data from a previous operation in the sequence of operations from the local storage as input data (e.g. the output feature map block from the previous operation in the sequence of operations as an input feature map block), one or more, and in an embodiment all, of the subsequent operations in the sequence of operations can, and in an embodiment do, also use other data (other input feature maps) as input data (for example to perform an appropriate elementwise operation with the output data from the previous operation in the sequence of operations).

Thus in an embodiment, one or more of, e.g. all of, the subsequent operations in the sequence of operations (after the first operation) use both output data from a previous operation in the sequence of operations (that has been stored in the local storage without first being written out to the main memory) as input data and other data (another input feature map or maps) as input data.

In this case, the other input data that is not output data from a previous operation in the sequence of operations is in an embodiment (loaded) from the main memory of the data processing system. In an embodiment it is loaded from the main memory of the data processing system to appropriate local storage (e.g., and in an embodiment, the chaining buffer), and then used from that local storage by the processing operation. In this case, the other input data that is not output data from a previous operation in the sequence of operations is in an embodiment loaded from the main memory into the local storage via (using) a DMA unit.

Thus, in an embodiment, a (subsequent) processing operation in the sequence of operations uses as input data both output data from a previous operation in the sequence of operations and data from the main memory, with both sets of data in an embodiment being stored in the local storage of the processor that is performing the neural network processing and used therefrom by the processing operation.

Thus, in an embodiment, the method of the technology described herein comprises (and the processor is correspondingly caused/configured to) loading input data (of an input feature map) from the main memory to local storage of the processor that is performing the neural network processing, and providing the input data loaded from the main memory together with the output data from a previous operation of the sequence of operations as input data for another operation in the sequence of operations from the local storage.

Thus in an embodiment, the performing of the sequence of operations for a block of an initial input data array for the sequence of operations comprises performing a first operation in the sequence of operations using input data from the main memory, and storing the output of that operation for the block of the initial input data array in local storage of the processor that is performing the neural network processing, performing a next (a second) operation in the sequence of operations using as input data, data of the output data from the first operation of the sequence of operations stored in and from the local storage, optionally, and in an embodiment, together with input data from the main memory (which is in an embodiment stored in the local storage and used therefrom as input data for the operation), and, where there are further operations in the sequence of operations, storing output data from the second operation in the local storage for use as input data for a next (the third) operation in the sequence of operations, and performing a next (a second) operation in the sequence of operations using as input data, data of the output data from the previous (second) operation of the sequence of operations stored in and from the local storage, optionally, and in an embodiment, together with input data from the main memory (which is in an embodiment stored in the local storage and used therefrom as input data for the operation), and, where there are further operations in the sequence of operations, storing output data from the third operation in the local storage for use as input data for a next (the fourth) operation in the sequence of operations (and so on, as appropriate) (or where there are no further operations in the sequence of operations, storing output data from the last operation in the sequence of operations in the main memory).

The output from the final operation in the sequence of operations is output to the main memory (is written to the main memory). This is such that that output can then be available, e.g. as a result of the overall neural network processing, or for use as input data for a later operation (layer) in the overall neural network processing.

In this regard, and as discussed above, the final operation in the sequence of operations may be the final operation in the overall neural network that is being executed (such that the output of the final operation in the sequence of operations will be data for (a part of) the result of the overall neural network that is being executed), or it may, more typically, and in an embodiment, be an output of an intermediate layer in the overall neural network processing, such as, and in an embodiment, data for (the appropriate block of) an output feature map of an intermediate layer of the overall neural network.

In the latter case at least, the output data may then be, and in an embodiment is, used as input data for another layer (operation) of the overall neural network (e.g. which may be the first operation (layer) of another sequence of operations to be performed in the manner of the technology described herein).

Thus the output data array which is generated by the sequence of operations from the initial input data array for the sequence of operations may, and in an embodiment does, comprise (an appropriate part of) an output feature map for the operation (layer) of neural network processing in question (that is the final operation in the sequence of operations). In this case, each respective block or sub-block (as discussed above) of the initial input data array that is subjected to the sequence of operations will be written out appropriately to the main memory, e.g., and in an embodiment, such that the outputs for each block/sub-block can be appropriately combined to provide the overall output feature map from the final operation in the sequence of operations.

The output from the final operation in a sequence of operations may be written out to the main memory in any suitable and desired manner. For example, it may be directly written out to the main memory, or it may be written out via local storage of the processor. In the latter case, the local storage is in an embodiment local storage that is intended for storing data that is being written out to the main memory, such as an output buffer, rather than the local storage, such as a chaining buffer, that is provided for transferring data between operations in a sequence of operations that is being performed in the manner of the technology described herein.

The processor that is performing the neural network processing can be caused to perform the neural network processing in the manner of the technology described herein in any suitable and desired manner. In an embodiment, this is done by providing appropriate commands (instructions) to the processor for the neural network processing, which commands cause the neural network processor to perform the desired neural network processing, including performing at least some of the neural network processing (a sequence of operations for the neural network processing) in the manner of the technology described herein.

In an embodiment, the processor is caused to perform neural network processing by means of a command stream that is provided to and executed by the processor, the command stream comprising a sequence of commands that when executed will cause the processor to perform the desired neural network processing.

The commands, e.g. in the command stream, in an embodiment then include appropriate encoding (indications) to cause the processor to operate in the manner of the technology described herein (where that is desired to be the case). Thus the commands (and in an embodiment commands in a command stream) will in an embodiment include appropriate encoding (indications) to cause the processor to, when it is executing a sequence of commands that perform a sequence of neural network processing operations, perform that sequence of neural network processing operations in the manner of the technology described herein. There may be multiple sequences of commands, e.g. in a given command stream, for an overall neural network to be executed that cause the corresponding sequence of neural network processing operations to be performed in the manner of the technology described herein.

The commands that are provided to the processor can cause it to operate in the manner of the technology described herein in any suitable and desired manner.

In an embodiment the commands can, and in an embodiment do, indicate whether input data for an operation is to read from the local storage or main memory, and/or (and in an embodiment and) whether the output of a neural network processing operation (layer) is to be stored in the local storage, or is to be written to main memory.

In an embodiment there are commands that define the input feature map or maps to be used for an operation, and commands that define the output feature map or maps for an operation, and these commands also indicate where the data is to be loaded from/stored. (In an embodiment, there are then in an embodiment (different) commands that define and trigger the processing operation(s) to be performed, e.g., and in an embodiment, using the defined input and output feature maps.)

In an embodiment, this is achieved by providing appropriate encoding, such as a flag or flags, in commands that can be sent to the processor to control the neural network processing, that can be used to indicate the storage location, i.e. the main memory or the local storage, for the data, e.g., feature map, in question.

In an embodiment for each input and output (input feature map and output feature map) of the neural network processing to be performed, the desired storage "mode", i.e. whether the data (feature map) is/is to be stored in the main memory or in the local storage, can be, and is, indicated. This is in an embodiment done using an appropriate "storage mode" flag or indicator in a command or descriptor relating to the input or output (feature map) in question.

In an embodiment, the indication also includes an indication of the "location" either in the memory or the local storage (as appropriate) of where the data (feature map) will be stored/is to be stored. In the case of data (feature maps) to be stored in the main memory, this indication is in an embodiment in the form of an appropriate memory block identifier (number) that can then be used to identify where the data (feature map) is or should be stored. Correspondingly, for data (feature maps) to be stored in the local storage, the identifier in an embodiment indicates the location (e.g. and in an embodiment the "slot") in the local storage that the data is or should be stored in.

Thus in an embodiment, the commands and/or descriptors that are provided to the processor to cause it to operate in the manner of the technology described herein can selectively indicate: that input data for an operation should be loaded from the main memory; that output data for an operation should be stored in the main memory; that input data for an operation should be loaded from the local storage; and that the output data for an operation should be stored in the local storage. Such commands/descriptors can in an embodiment then be selectively included in a command stream for a processor that is to perform the neural network processing.

In an embodiment there is: a first form of command/descriptor (and in an embodiment a first form of indication that can be included in a command/descriptor) that indicates that an input for an operation should be read from main memory; a second, different form of command/descriptor (and in an embodiment a second form of indication that can be included in a command/descriptor) that indicates that an input for an operation should be read from the local storage; a third, different form of command/descriptor (and in an embodiment a third form of indication that can be included in a command/descriptor) that indicates that the output from an operation should be stored in the local storage; and a fourth, different form of command/descriptor (and in an embodiment a fourth form of indication that can be included in a command/descriptor) that indicates that the output from an operation should be stored in the main memory.

These different commands and/or descriptors can then in an embodiment be, and in an embodiment are, included in a stream of commands for execution by the processor that is to perform the neural network processing to cause the processor to operate in the desired manner.

Other arrangements would, of course, be possible.

In an embodiment, the commands that are sent to the processor identify sequences of operations that are to be performed in the manner of the technology described herein (with the processor then performing any such identified sequence of commands in the manner of the technology described herein). This can be done in any suitable and desired manner.

In an embodiment, the commands that are provided to the processor to cause it to perform neural network processing (a neural network processing operation) are also configured to indicate (identify), and indicate (identify), whether the neural network processing operation (layer) triggered by the command(s) is part of a sequence of operations that should be performed in the manner of the technology described herein or not.

This can be done in any suitable and desired manner. In an embodiment, appropriate indications (e.g. flags) are included with (e.g. encoded in) a command or commands in the sequence of commands that is to be executed by the processor, to identify operations triggered by the sequence of commands that should be performed in the manner of the technology described herein.

For example a command that triggers a neural network processing operation could include a flag to indicate whether it is part of a sequence of operations to be performed in the manner of the technology described herein or not (e.g. with the preceding operation in the command sequence).

Additionally or alternatively, the start and/or end of a sequence of operations that is to be performed in the manner of the technology described herein could be indicated. For example, an indication could be used to mark the end of a sequence of operations that is to be performed together in the manner of the technology described herein. For example, it could be indicated when an operation is (or is not) the final operation in a sequence of operations that is to be performed together in the manner of the technology described herein. Such an indication could comprise, for example, the output (the output feature map) for an operation (layer) being designated as either to be to the local storage, chaining buffer, or to the main memory, thereby indicating whether an operation is (or is not) the final operation in a sequence of operations. For example, an operation having an output to an output feature map in (main) memory, rather than to the local storage chaining buffer, could be used to indicate, and interpreted as signalling, the end of a sequence (chain) of operations.

It would also be possible, for example, to include a command or commands that indicates (e.g. lists) the operations to be performed in a sequence (e.g. instead of signalling for individual operations whether the operation belongs to a sequence of operations to be performed in the manner of the technology described herein).

Other arrangements would, of course, be possible.

The sequence of commands (the command stream) that is provided to the processor that is to execute the neural network processing can be generated and provided in any suitable and desired manner.

In an embodiment, the commands and command stream are prepared based on an analysis of the neural network processing operations that are to be performed for the neural network in question. The neural network operations to be performed may be determined and analysed in any suitable and desired manner. In an embodiment this is done from and based on an appropriate definition (indication) of the required neural network processing, for example in the form of an appropriate neural network graph, indicating the operations for the neural network.

The command (stream) preparation operation in an embodiment analyses each operation in the sequence of operations for the neural network in turn, starting with the first operation, and determines whether that operation is suitable as a first operation for a sequence of operations to be performed in the manner of the technology described herein or not. In an embodiment this comprises determining whether the operation is one of a non-elementwise (e.g. a convolution or pooling) operation and an elementwise operation, but other arrangements would, of course, be possible.

If (when) it is determined that an (the) operation is not suitable to be a first operation for a sequence of operations to be performed in the manner of the technology described herein (e.g. it is not a non-elementwise operation or an elementwise operation), then in an embodiment it is determined that that operation should be performed as a "standalone" operation, and so a command or commands that will cause that operation to be performed on its own, in an embodiment using the main memory for any inputs and outputs (input feature maps and output feature maps) of the operation, are generated and included in the command stream.

On the other hand, if (when) it is determined that the operation being considered is suitable as the first operation for a sequence of operations to be performed in the manner of the technology described herein, then the next operation in the overall sequence of operations for the overall neural network being performed is considered to determine whether it is suitable to be a subsequent operation in a sequence of operations that is to be performed in the manner of the technology described herein. In an embodiment, this comprises determining whether the next operation is an elementwise operation and whether the output from the previous operation is used only as an input to the next operation or not.

If (when) it is determined that an (the) operation is not suitable to be a subsequent (second) operation for a sequence of operations to be performed in the manner of the technology described herein (e.g. it is not an elementwise operation or its output is required for more than the next operation), then in an embodiment it is determined that that operation should be performed as a "standalone" operation, and so a command or commands that will cause that operation to be performed on its own, in an embodiment using the main memory for any inputs and outputs (input feature maps and output feature maps) of the operation, are generated and included in the command stream.

On the other hand if (when) it is determined that the next operation is suitable to be included in a sequence with the previous operation, the next operation in the overall sequence of operations for the neural network is then considered to determine whether it is suitable to be a subsequent operation in a sequence of operations that is to be performed in the manner of the technology described herein with the preceding two operations.

This process is repeated until an operation that is not suitable to act as the next operation in a sequence of operations to be performed in the manner of the technology described herein is reached, in an embodiment subject to a particular, in an embodiment selected, in an embodiment predetermined, maximum number of subsequent operations not being reached (as discussed above, in an embodiment, there is in an embodiment a limit on the number of operations that can be performed in a sequence of operations that is to be performed in the manner of the technology described herein).

Thus, in an embodiment, a sequence of operations will be finished when the first of an operation that is not suitable to act as the next operation in a sequence of operations to be performed in the manner of the technology described herein being reached, or a particular, in an embodiment selected, in an embodiment predetermined, maximum number of subsequent operations being reached, occurs.

Once this has happened, then a sequence of operations that is to be performed in the manner of the technology described herein has been identified, and so appropriate commands for that sequence of operations, indicating in particular, indications (encoding) that the operations are all part of the same sequence of operations, and that the outputs from the first to the penultimate operations in the sequence of operations should be stored to the local storage, with only the output for the final operation in the sequence of operations being stored to the main memory, are generated (and, in an embodiment, added to the command stream).

The next operation in the sequence of operations for the overall neural network will then be considered to determine whether it is suitable to be a first operation in a (new) sequence of operations that is to be performed in the manner of the technology described herein, and then either a new sequence of operations to be performed in the manner of the technology described herein determined (in the manner discussed above), or that operation included in the command stream as a "standalone" operation (as discussed above).

This process will be repeated for all the operations of the neural network in question, as appropriate, until the commands (command stream) for executing the entire neural network has been generated.

Once the commands (command stream) for the entire neural network to be executed has been prepared, they may be stored, for example, in the main memory, and then the commands (in the command stream) provided therefrom to the processor that is to execute the neural network for execution, with the processor then executing the commands to execute the neural network accordingly.

In an embodiment, as well as preparing suitable commands to cause the processor that is to execute the neural network to execute the neural network in the desired manner, any appropriate data structures, e.g. comprising the desired input feature maps and/or weight arrays (filters) to be used for the neural network, are in an embodiment also prepared and, e.g., and in an embodiment, stored appropriately in the main memory.

The sequences of commands and the appropriate data (e.g. input feature maps and weight arrays) to perform the neural network processing can then be retrieved from the memory, and, e.g., executed and used by the processor that is to perform the neural network processing to perform the desired neural network processing.

a. The data structures, commands to be executed by the processor, etc., can be generated by any suitable and desired element and component of the overall data processing system.

In an embodiment, the data structures, and/or commands to be executed by the processor, etc., are generated in advance of the processor executing the neural network processing (and in an embodiment by a different processor to the processor (accelerator) that performs the neural network processing itself). For example, such preparation may be performed offline (prior to runtime of the neural network processing), e.g. by a host processor or other suitable processor of the same or another data processing system.

In embodiments, preparation of data structures and/or preparation of commands to be executed by the processor for performing the neural network processing is done by a compiler for the processor that is to perform the neural network processing, which compiler is, e.g., and in an embodiment, executed on a CPU of the data processing system. In embodiments, the compiler comprises a compiler circuit, comprising a programmable processing circuit that is appropriately programmed to perform the required compiler operation.

Thus, in an embodiment, the compiler is configured to, and operates to, based on the neural network processing to be performed, prepare and store appropriate sequences of commands and data structures for causing a processor to perform the neural network processing in the manner of the technology described herein.

The compiler may execute as part of a driver operation for the processor that is to perform the neural network processing (for example, executing in response to a request for neural network processing by an e.g. application, e.g. executing on a host processor (CPU) of the data processing system).

The compiler execution may be performed in advance of any execution of and performing of the neural network processing itself, in an "offline" manner. Thus the compilation process is in an embodiment done in advance of runtime, rather than at runtime for the neural network in question. Correspondingly, the compiler in an embodiment executes separately and in advance of running the driver (the driver operation for the processor that is to perform the neural network processing).

In this latter case, the compiler operation will accordingly, and in an embodiment, prepare in advance data structures, sequences of commands, etc., for performing neural network processing in the manner of the technology described herein, which data structures, sequences of commands, etc., can then be stored for future use.

Then, e.g. at runtime, the, e.g., driver, will identify and determine the neural network processing to be performed (e.g. based on a request for neural network processing, e.g. from an application requiring neural network processing, e.g. executing on a host processor (CPU) of the data processing system), and issue the appropriate sequence of commands, and/or data structures to the processor for execution/use to perform the desired neural network processing.

The technology described herein extends to compiler operation in the manner of the technology described herein per se.

Hence, an embodiment of the technology described herein comprises a compiler for compiling a neural network to be executed by a processor operable to perform neural network processing, the compiler comprising:

a neural network analysing circuit configured to, for a neural network comprising a set of plural neural network processing operations to be performed:

determine whether there are any sequences of operations in the set of operations for the neural network that can be performed as a chained sequence of operations in which:

the processing of an initial input data array for the sequence of operations through the sequence of operations to generate a final output data array of the sequence of operations can be performed on a block-by-block basis, such that the initial input data array is processed as one or more blocks which are each processed independently according to the sequence of operations to generate a corresponding block of the final output data array for the sequence of operations; and at least one of the operations in the sequence of operations uses output data from a previous operation in the sequence of operations as input data;

the compiler further comprising a command generating circuit configured to, when it is determined that there is a sequence of operations in the set of operations for the neural network that can be performed as a chained sequence of operations:

a. generate a sequence of neural network processing commands that when executed by a processor operable to perform neural network processing will cause the processor to:

b. perform neural network processing comprising the determined sequence of operations to process an initial input data array for the sequence of operations to generate a final output data array of the sequence of operations for respective blocks of the initial input data array on a block-by-block basis, such that the initial input data array is processed as one or more blocks which are each processed independently according to the sequence of operations to generate a corresponding block of the final output data array; and c. perform the neural network processing comprising the sequence of operations for a block of the initial input data array by:

i. performing the operations of the sequence of operations one after another for the block of the initial input data array to generate a block of the final output data array; and ii. when performing an operation in the sequence of operations whose output data is to be used as input data for another operation in the sequence of operations, storing the output data which is to be used as input data for another operation of the sequence of operations in local storage of the processor that is performing the neural network processing, and providing the output data as input data for the another operation in the sequence of operations from the local storage; and iii. for the final operation in the sequence of operations, storing output data generated by the final operation corresponding to a block of the final output data array in a main memory.

Another embodiment of the technology described herein comprises a method of compiling a neural network to be executed by a processor operable to perform neural network processing, the method comprising:

for a neural network comprising a set of plural neural network processing operations to be performed:

determining whether there are any sequences of operations in the set of operations for the neural network that can be performed as a chained sequence of operations in which:

the processing of an initial input data array for the sequence of operations through the sequence of operations to generate a final output data array of the sequence of operations can be performed on a block-by-block basis, such that the initial input data array is processed as one or more blocks which are each processed independently according to the sequence of operations to generate a corresponding block of the final output data array for the sequence of operations; and at least one of the operations in the sequence of operations uses output data from a previous operation in the sequence of operations as input data;

the method further comprising, when it is determined that there is a sequence of operations in the set of operations for the neural network that can be performed as a chained sequence of operations:

generating a sequence of neural network processing commands that when executed by a processor operable to perform neural network processing will cause the processor to:

perform neural network processing comprising the determined sequence of operations to process an initial input data array for the sequence of operations to generate a final output data array of the sequence of operations for respective blocks of the initial input data array on a block-by-block basis, such that the initial input data array is processed as one or more blocks which are each processed independently according to the sequence of operations to generate a corresponding block of the final output data array; and perform the neural network processing comprising the sequence of operations for a block of the initial input data array by:

performing the operations of the sequence of operations one after another for the block of the initial input data array to generate a block of the final output data array; and when performing an operation in the sequence of operations whose output data is to be used as input data for another operation in the sequence of operations, storing the output data which is to be used as input data for another operation of the sequence of operations in local storage of the processor that is performing the neural network processing, and providing the output data as input data for the another operation in the sequence of operations from the local storage; and for the final operation in the sequence of operations, storing output data generated by the final operation corresponding to a block of the final output data array in a main memory.

As will be appreciated by those skilled in the art, the embodiments of the technology described herein can, and in an embodiment do, comprise any one or more or all features described herein, as appropriate.

Thus, for example, the determining of whether the set of operations for the neural network includes a sequence of operations that can be performed as a chained sequence of operations in an embodiment comprises determining whether there is a sequence of operations that starts with a non-elementwise or elementwise operation, followed by one or more elementwise operations, and in which the output of each operation is used as (and only as) an input to the next operation, with any such identified sequence of operations then being determined as being suitable to be a chained sequence of operations.

Equally, the identification and generation of chained sequences of operations is in an embodiment subject to a particular, in an embodiment selected, in an embodiment predetermined, maximum number of operations that may be included in a chained sequence of operations.

Correspondingly the compiler and compiling operation is in an embodiment operable to and configured to include in the sequence of neural network processing commands, appropriate commands which when executed will cause the processor to read the input for a neural network processing operation from either the main memory or local storage, as appropriate, and to, correspondingly, store the output of a neural network processing operation in the local storage or the main memory, as appropriate.

Thus, the compiler and compiling operation can in an embodiment selectively include in a stream of commands for execution by the processor that is to perform the neural network processing commands and/or descriptors to indicate: that input data for an operation should be loaded from the main memory; that output data for an operation should be stored in the main memory; that input data for an operation should be loaded from the local storage; and that the output data for an operation should be stored in the local storage.

Thus the compiler and compiling operation is in an embodiment operable to and configured to, and comprises, selectively including in the sequence of commands to be executed by a processor operable to perform neural network processing:

- a first form of command/descriptor (and in an embodiment a first form of indication that can be included in a command/descriptor) that indicates that an input for an operation should be read from the main memory;
- a second, different form of command/descriptor (and in an embodiment a second form of indication that can be included in a command/descriptor) that indicates that an input for an operation should be read from the local storage;
- a third, different form of command/descriptor (and in an embodiment a third form of indication that can be included in a command/descriptor) that indicates that the output from an operation should be stored in the local storage; and
- a fourth, different form of command/descriptor (and in an embodiment a fourth form of indication that can be included in a command/descriptor) that indicates that the output from an operation should be stored in the main memory.

As discussed above, in an embodiment, the indication of whether the input and/or output for an operation should be read from or stored to the main memory or the local storage is in an embodiment given by including an appropriate indication (indicator) of that in the command/descriptor (or sequence of commands/descriptors) that is included in or referenced in the command stream.

Once the commands (the command stream) and the data structures (if required) for the neural network processing have been prepared and, e.g., stored in the main memory, then the processor can be triggered and caused to perform the corresponding neural network processing. As discussed above, this is in an embodiment triggered by the, e.g. driver for the processor, issuing the appropriate sequence of commands and/or data structures to the processor for execution/use to perform the desired neural network processing, with the processor then executing the commands (e.g. in sequence), to perform the neural network processing using the appropriate data structures).

To facilitate this, the processor that is executing the neural network in an embodiment includes an appropriate control circuit for controlling the operation of the processor when performing neural network processing, that can, for example, and in an embodiment, load commands to be executed from main memory, execute those commands, and control the functional units, etc., of the processor that is executing the neural network to operate accordingly in response to the commands (as they are executed).

In order to support operation in the manner of the technology described herein, the processor that is executing the neural network processing (and in an embodiment the control circuit of the processor) is in an embodiment operable to, and configured to, recognise in a sequence of commands (a command stream) to perform neural network processing, a sequence of operations that are to be performed in the manner of the technology described herein, and to, when it recognises in a sequence of commands (a command stream) to perform neural network processing, a sequence of operations that are to be performed in the manner of the technology described herein, subdivide the processing of the initial input data array to the sequence of operations into one or more, and in an embodiment a plurality of, blocks/sub-blocks (as discussed above), and then cause the processor to execute the sequence of operations for the blocks/sub-blocks, and in an embodiment one after another, until the sequence of operations has been completed for the entire initial input data array.

This may be done in any suitable and desired manner. In an embodiment, the control circuit controls the processor (the functional units of the processor) to perform the sequence of operations for a first block/sub-block of the initial input data array, and then for a next block/sub-block of the initial input data array, and so on.

Thus in an embodiment, the control circuit is operable to decompose the initial input data array for a sequence of operations to be performed in the manner of the technology described herein into a number of blocks/sub-blocks, and to then cause the processor to perform the sequence of operations for the blocks/sub-blocks in turn, until the sequence of operations has been completed for all the blocks/sub-blocks.

In order to further facilitate this operation, the control circuit of the processor that is performing the neural network processing in an embodiment has corresponding, e.g. state, storage, for storing the (definitions of the) operations to be performed for the sequence of operations (as those operations will need to be repeated for each block/sub-block, and therefore cannot simply be "discarded" once they have been performed once). In this case, the control circuit can in an embodiment store up to the particular maximum number of operations that may be included in a sequence of operations to be performed in the manner of the technology described herein.

In an embodiment, the command for the first operation in a sequence of chained operations specifies the block size for that first operation (e.g. a convolution operation), e.g. and in an embodiment in terms of the output feature map block size, but then the processor that is performing the neural network processing (the control circuit of the processor) further subdivides that (e.g. accumulator) block size into smaller sub-blocks for processing through the subsequent operations in the sequence of chained operations (as discussed above).

Thus, in an embodiment, the processor (the control circuit of the processor) that is performing the neural network processing is configured to cause the processor to perform the first operation in a sequence of chain operations based on and using a block size specified in the command stream for the first operation, and to then cause the subsequent operations in the sequence of chained operations to be performed for respective sub-blocks of the specified block size (on a sub-block-by-sub-block basis) (without the sub-block size being specified or needing to be specified in the commands (in the command stream) itself). The sub-block size that the control circuit divides respective blocks into is in an embodiment a particular, in an embodiment selected, in an embodiment predefined, sub-block size, which may be based, for example, on the capacity of the local storage and/or the processing capabilities of the activation output (AO) circuit (unit), and/or the particular operations to be performed, etc., as desired.

Thus the control circuit is in an embodiment operable to and configured to decompose an initial input data array for a sequence of operations to be performed in the manner of the technology described herein into a number of blocks for the first operation in the sequence of operations based on an indicated block size in the commands (in the command stream) for the sequence of operations, and to cause the processor to perform the first operation in the sequence of operations for the blocks (e.g. in turn), and to decompose each block from the first operation into a number of smaller sub-blocks, and to cause the processor to perform the remaining operations of the sequence of operations for a block on a sub-block-by-sub-block basis (e.g. in turn), until the sequence of operations has been completed for all the sub-blocks of a given block (and correspondingly for all the blocks).

In an embodiment, once the processor has begun executing a sequence of operations in the manner of the technology described herein, then in an embodiment the system is constrained such that any pausing or stopping of the neural network processing by the processor can only be done once the particular sequence of operations has been completed for the entire initial input data array (for all the blocks of the initial input data array). In other words, in an embodiment, it is possible to pause or stop the neural network processing by the processor between sequences of operations that are to be performed in the manner of the technology described herein, but not during the execution of a sequence of operations in the manner of the technology described herein.

The technology described herein also extends to the operation of a processor performing neural network processing in the manner of the technology described herein.

Thus, an embodiment of the technology described comprises a method of operating a processor operable to execute neural network processing, the processor operable to execute neural network processing having an associated local storage operable to store data for neural network processing when the processor is performing neural network processing;

the method comprising the processor:

performing neural network processing comprising a sequence of operations to process an initial input data array for the sequence of operations to generate a final output data array of the sequence of operations for respective blocks of the initial input data array on a block-by-block basis, such that the initial input data array is processed as one or more blocks which are each processed independently according to the sequence of operations to generate a corresponding block of the final output data array;

wherein:

at least one of the operations in the sequence of operations uses output data from a previous operation in the sequence of operations as input data; and performing the neural network processing comprising the sequence of operations for a block of the initial input data array comprises:

performing the operations of the sequence of operations one after another for the block of the initial input data array to generate a block of the final output data array; and when performing an operation in the sequence of operations whose output data is to be used as input data for another operation in the sequence of operations, storing the output data which is to be used as input data for another operation of the sequence of operations in the local storage of the processor, and providing the output data as input data for the another operation in the sequence of operations from the local storage; and for the final operation in the sequence of operations, storing output data generated by the final operation corresponding to a block of the final output data array in a main memory.

Another embodiment of the technology described herein comprises a processor operable to execute neural network processing, the processor operable to execute neural network processing comprising:

a local storage operable to store data for neural network processing when the processor is performing neural network processing; and a control circuit configured to:

cause the processor to perform neural network processing comprising a sequence of operations to process an initial input data array for the sequence of operations to generate a final output data array of the sequence of operations for respective blocks of the initial input data array on a block-by-block basis, such that the initial input data array is processed as one or more blocks which are each processed independently according to the sequence of operations to generate a corresponding block of the final output data array;

wherein:

at least one of the operations in the sequence of operations uses output data from a previous operation in the sequence of operations as input data;

and cause the processor to perform the neural network processing comprising the sequence of operations for a block of an initial input data array by:

performing the operations of the sequence of operations one after another for the block of the initial input data array to generate a block of the final output data array; and:

when performing an operation in the sequence of operations whose output data is to be used as input data for another operation in the sequence of operations, storing the output data which is to be used as input data for another operation of the sequence of operations in the local storage of the processor, and retrieving the output data for use as input data for the another operation in the sequence of operations from the local storage; and:

for the final operation in the sequence of operations, storing output data generated by the final operation corresponding to a block of the final output data array in a main memory.

As will be appreciated by those skilled in the art, the technology described herein can, and in an embodiment does, include any one or more or all of the features described herein. Thus, for example, the control circuit that causes the processor to perform the neural network processing in an embodiment executes a sequence of commands that trigger the desired neural network processing operation.

Equally, the control circuit is in an embodiment operable to recognise from a sequence of commands to be executed to perform neural network processing, when the sequence of commands is to perform and trigger a chained sequence of operations in the manner of the technology described herein, and to, when it recognises such a sequence of commands in a set of commands to be executed to perform neural network processing, then cause the processor to perform the sequence of operations on a block-by-block basis in the manner of the technology described herein. The control circuit can recognise a sequence of commands for performing a sequence of operations in the manner of the technology described herein in an embodiment based on suitable encoding (indications) of that included in the sequence of commands to be executed (as discussed above).

Correspondingly, the control circuit is in an embodiment operable to and configured to recognise from a command to be executed to perform neural network processing whether an input for an operation for neural network processing should be read from main memory or the local storage, and correspondingly, whether the output from a neural network processing operation should be written to the local storage or the main memory (and to cause the processor to operate accordingly).

Thus the control circuit is in an embodiment operable to, and configured to, (selectively) cause the processor to write an output of an operation to the main memory or to the local storage of the processor, in an embodiment in response to, and in dependence upon, command(s) that are included in a sequence of commands to be executed to perform neutral network processing.

Similarly, the control circuit is in an embodiment operable to, and configured to, (selectively) cause the processor to read an input for an operation from the main memory or from the local storage of the processor, in response to, and in dependence upon, commands that are included in a sequence of commands to be executed to perform neutral network processing.

As discussed above, in an embodiment, the indication of whether the input and/or output for an operation should be read from or stored to the main memory or the local storage is in an embodiment given by including an appropriate indication of that in a command/descriptor (and/or a sequence of commands/descriptors) that is included in or referenced in the command stream.

Thus, in an embodiment, the control circuit is operable to: in response to a first indication in a command to be executed to perform neural network processing, cause the processor to read input data for an operation (in the sequence of operations) from the main memory; in response to a second, different indication in a command to be executed to perform neural network processing, cause the processor to read input data for an operation (in the sequence of operations) from the local storage; in response to a third, different indication in a command in a sequence of commands to be executed to perform neural network processing, cause the processor to write the output from an operation (of the sequence of operations) to the local storage; and in response to a fourth, different indication in a command in a sequence of commands to be executed to perform neural network processing, cause the processor to write the output from an operation (of the sequence of operations) to the main memory.

In this way, the control circuit can selectively cause the processor to read input data from and write output data to the desired storage in response to, and in dependence upon, commands in a sequence of commands to be executed to perform neural network processing.

As well as the processor and the main memory, the data processing system of the technology described herein may include any other suitable and desired components, elements, etc., that a data processing system may comprise. Thus it may, for example, and in an embodiment, comprise a host processor (e.g. CPU) that can execute applications that may require neural network processing by the processor that executes the neural network. The host processor (e.g. CPU), may, as discussed above, execute an appropriate driver for the neural network processor, to control the neural network processor to perform desired neural network processing operations. The data processing system may also include other processors (which may equally be able to perform neural network processing), such as a graphics processor, a video processor, an image signal processor (ISP), etc.

The data processing system may comprise and/or be in communication with one or more memories (such as the memories described above) that store the data described herein, and/or store software for performing the processes described herein. The data processing system may comprise and/or be in communication with a host microprocessor, and/or with a display for displaying output data associated with the neural network processing.

The data processing system of the technology described herein may be implemented as part of any suitable system, such as a suitably configured micro-processor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuits, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing circuits may share processing circuits, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a data processing system 100 system which may be configured to perform neural network processing in the manner of the technology described herein. The system 100 comprises a System on Chip (SoC) system 110. Parts of the data processing system which may be on chip comprise an image signal processor (ISP) 102, a video decoder 103, an audio codec 104, a CPU 105 and a neural network processor (NPU) 106, which may be operably connected to a memory controller 108 by means of a suitable interconnect 107. A sensor 101 may provide input data for the system 100 (e.g. video data and/or sound data from a suitable camera or microphone or other sensor device).

As shown in FIG. 1, the data processing system further comprises main memory, which comprises both on-chip SRAM 111 and off-chip memory 109. As will be discussed further below, the neural network processor (NPU) 106 has access to this main memory (via the interconnect (bus interface) 107).

Although the CPU and NPU are shown separately in FIG. 1, the neural network could be executed by the CPU or other processor such as a GPU, if desired.

Figure 2:
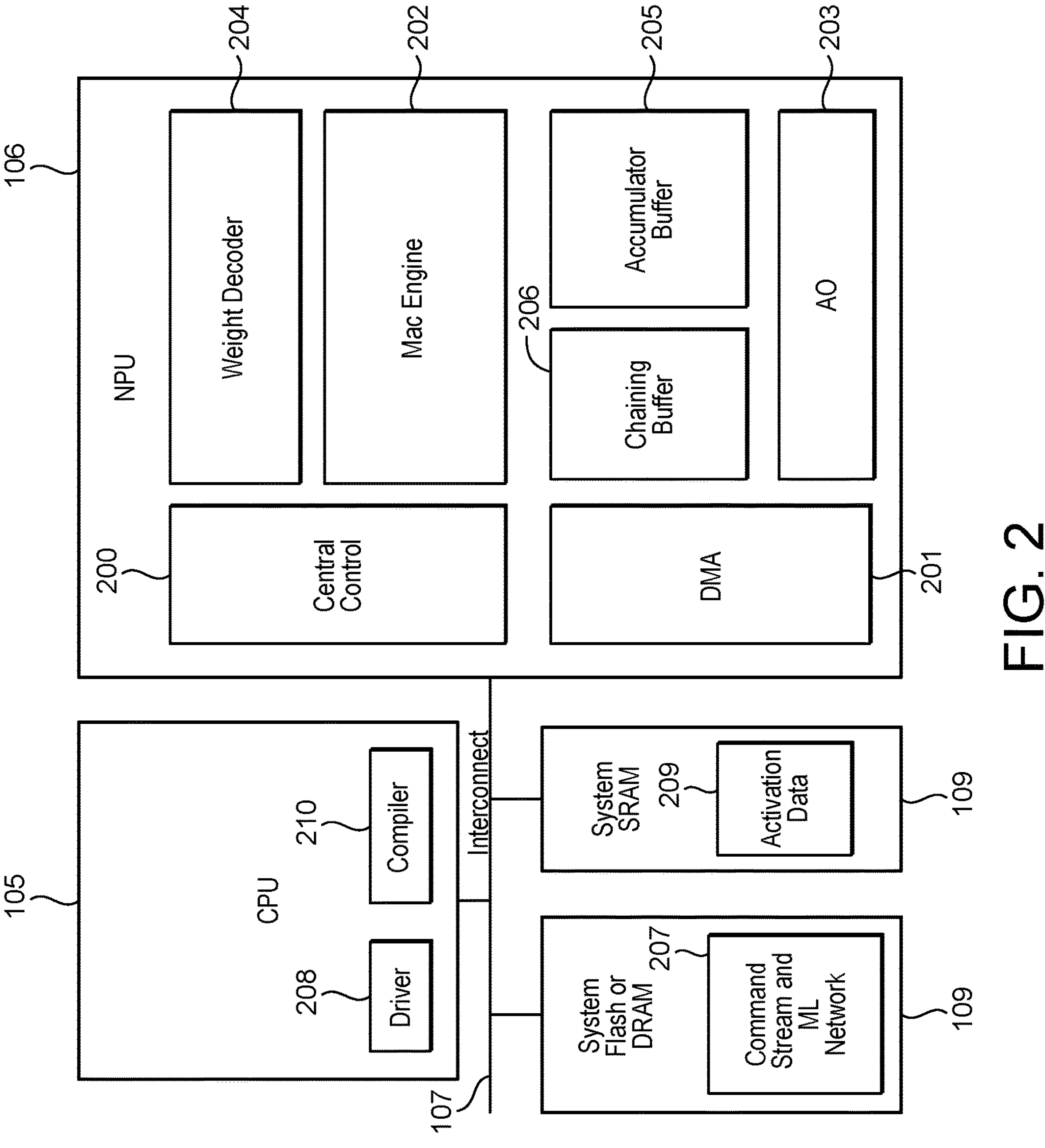
FIG. 2 shows the neural network processor of the present embodiments in more detail.

FIG. 2 shows the neural network processor (NPU) 106 in the system-on-chip 110 of FIG. 1 in more detail.

As shown in FIG. 2, in order to be able to perform neural network processing, the NPU 106 firstly includes a MAC (a multiply-accumulate) engine (circuit) 202, which is operable to perform, inter alia, multiply-accumulate (dot product operations) (for example for convolution and pooling layers of neural network processing). In the present embodiments, the MAC unit is also operable to perform, and used to perform, other (potentially non-elementwise) operations, such as pooling and/or min/max reductions. The results of processing by the MAC engine 202 may be stored in local storage, in the form of an accumulator buffer 205, of the NPU 106.

The NPU 106 also includes an appropriate weight decoder circuit (unit) 204 which is operable to decode weights (filters) to be used, for example, by the MAC engine 202 when performing convolution operations.

The NPU 106 also includes an AO (activation output) circuit (unit) 203, which is configured to perform element wise operations, such as addition, subtraction, division and multiplication. In accordance with the technology described herein, the AO unit 203 may store data in and retrieve data from local storage in the form of an internal chaining buffer 206 provided on the NPU 106 when performing a sequence (a chain) of neural network processing operations. This will be discussed in more detail below.

The operation of the NPU 106 is controlled by means of a central control circuit 200 that is operable to load and then execute commands for neural network processing from a command stream 207 that may be stored in the main memory 109 indicating neural network processing to be performed by the NPU 106. A driver 208 for the NPU 106 executing on the CPU 105 may, for example, set up a pointer to the command stream in the memory, and provide the pointer to the NPU 106, so that it can fetch and execute the command stream.

The control unit 200 will execute commands in a command stream indicating neural network processing to be performed, and in response to those commands, control the various elements of the NPU 106, such as the MAC engine 202 and the AO unit 203, to perform the desired neural network processing in response to the commands.

As shown in FIG. 2, the NPU 106 also includes an appropriate direct memory access circuit (unit) 201 which is operable to fetch commands, data, etc., from the memory 109 required by the NPU 106, and store in the memory 109 data generated by the NPU 106. Thus the DMA unit 201 will, for example, load a command stream 207 from the memory 109 for execution by the NPU 106 under the control of the central control circuit 200. The DMA unit 201 will also load appropriate input, activation, and weight, etc. data 209 from the memory 109 for use by the NPU 106 when performing neural network processing.

It will be appreciated that the NPU 106 may include other elements, components, circuits, etc., that are not shown in FIG. 2. FIG. 2 simply shows schematically those elements, circuits, etc. of the NPU 106 that are particularly relevant to the operation in the manner of the present embodiments.

In the present embodiments, and in accordance with the technology described herein, the NPU 106 is operable to perform a sequence (a "chain") of operations for neural network processing on a block by block basis, and in which output data from an operation in the sequence of operations that is to be used as input data for the next operation in the sequence of operations is stored in the local storage chaining buffer 206 of the NPU 106 and then used therefrom as input data for the next operation in the sequence of operations, and so on, with the output data generated by the final operation of the sequence of operations then being written out to the main memory.

Figure 3:
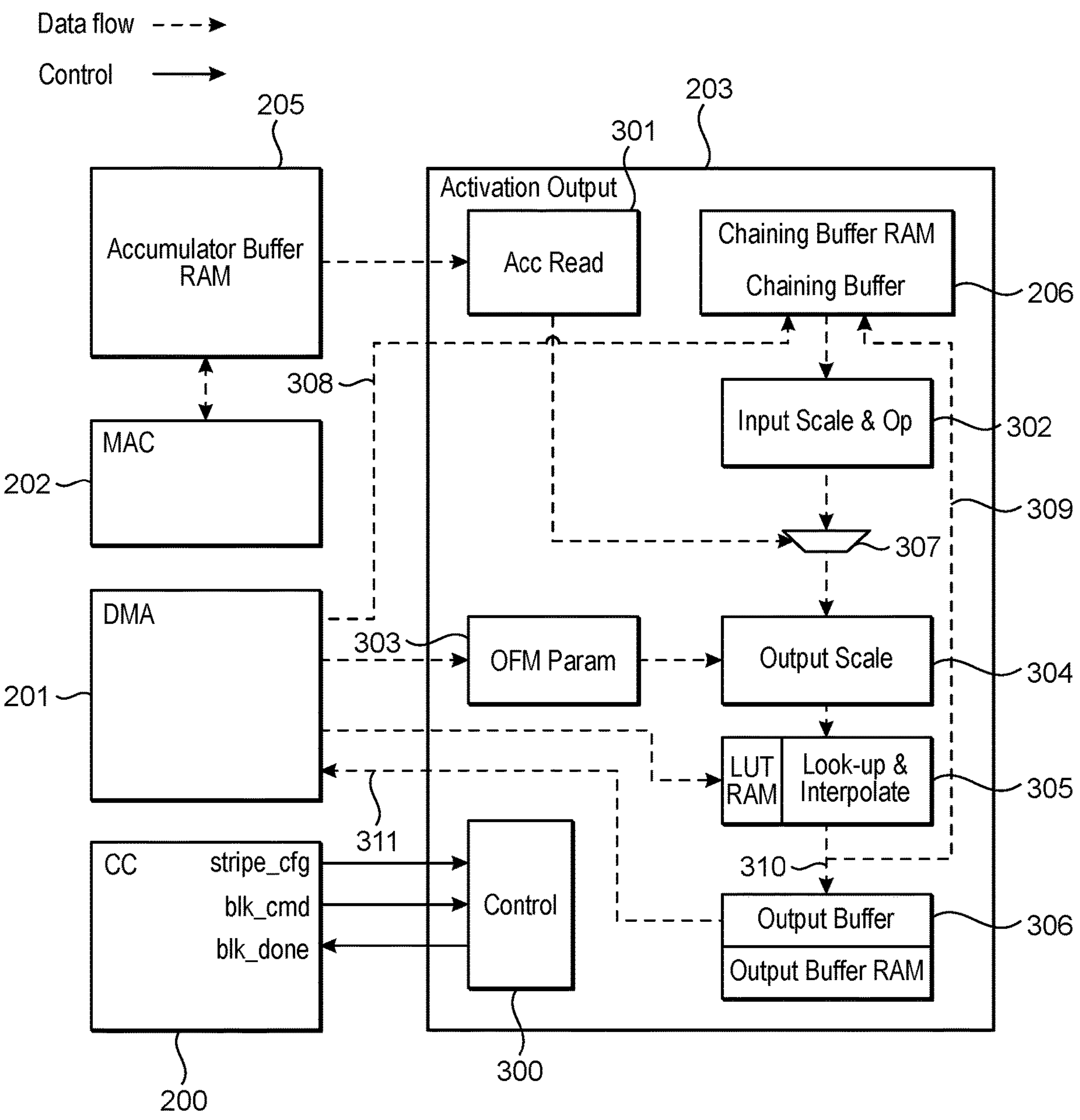
FIG. 3 shows schematically a data flow in a neural network processor in an embodiment.

FIG. 3 shows schematically the data flow within the activation output unit 203 when operating in this manner.

As shown in FIG. 3, this will be done under the control of a control circuit 300 of the activation output unit 203, based on control signals from the central control unit 200.

By way of example, FIG. 3 exemplifies the data flow to and from and within the activation output unit 203 when performing a sequence of operations that comprises an initial convolution operation that may then be followed by one of more elementwise operations that are performed by the activation output unit 203.

Thus, as shown in FIG. 3, the MAC unit 202 may perform an initial convolution operation and store the results of that operation in the accumulator buffer 205. Then, the result of that accumulation operation may be read 301 by the activation output unit 203 from the accumulator buffer 205 and scaled 304 and stored in a local storage, chaining buffer 206 for the activation output unit 203 for use as input data to a subsequent elementwise operation.

As shown in FIG. 3, an elementwise operation 307 performed by the activation output unit 203 may also use as an input data (blocks of input feature maps) from the chaining buffer 206 (which may be subjected to an appropriate scaling and other pre-processing operation 302, if desired). As shown in FIG. 3, the data that is used as an input to an elementwise operation that is stored in the chaining buffer 206 may be loaded 308 from the main memory by the DMA unit 201 or may be output data from a previous elementwise operation that has been stored 309 in the chaining buffer 206.

As shown in FIG. 3, the result of the elementwise operation 307 using, for example, data from the chaining buffer 206, potentially together with data from the accumulation buffer 205, may be appropriately scaled 304 (based on output feature map parameters 303 fetched from the memory by the DMA unit 201), and then subjected to an appropriate desired interpolation operation 305 (again based on appropriate parameters fetched from the memory via the DMA unit 201) (for example, the lookup may implement a non-linear activation function, such as hyperbolic tangent, tanh( )), if desired.

Then, and as will be discussed in more detail below, if the elementwise operation is an intermediate operation in the sequence (chain) of operations that is being performed, the appropriately processed output from the elementwise operation will be stored 309 in the chaining buffer 206 for use as an input for the next elementwise operation in the sequence, or if it is the final elementwise operation in the sequence (chain), the output from that final elementwise operation will be stored 310 in an output buffer 306 and then written therefrom 311 to the main memory 109 by the DMA unit 201.

In this way, as shown in FIG. 3, output feature maps from elementwise operations being performed by the activation output unit 203 in a sequence of operations are provided as inputs to the next elementwise operation in the sequence of operations via the chaining buffer 206, rather than having to be written out to the main memory between the elementwise operations in the sequence, with only the result of the final elementwise operation in the sequence being written out to the main memory.

In the present embodiments, to facilitate this operation, the chaining buffer 206 is configured as an internal streaming buffer in the form of a FIFO and configured to have a plurality of "slots" in which different respective input data for an elementwise operation can be stored. In the present embodiment, the chaining buffer 206 supports three slots for storing input feature map data read from the main memory, and three slots for storing output feature map data from an elementwise operation (which is then to be used as an input feature map data for a next elementwise operation in a sequence of elementwise operations that is being executed).

Figure 4:
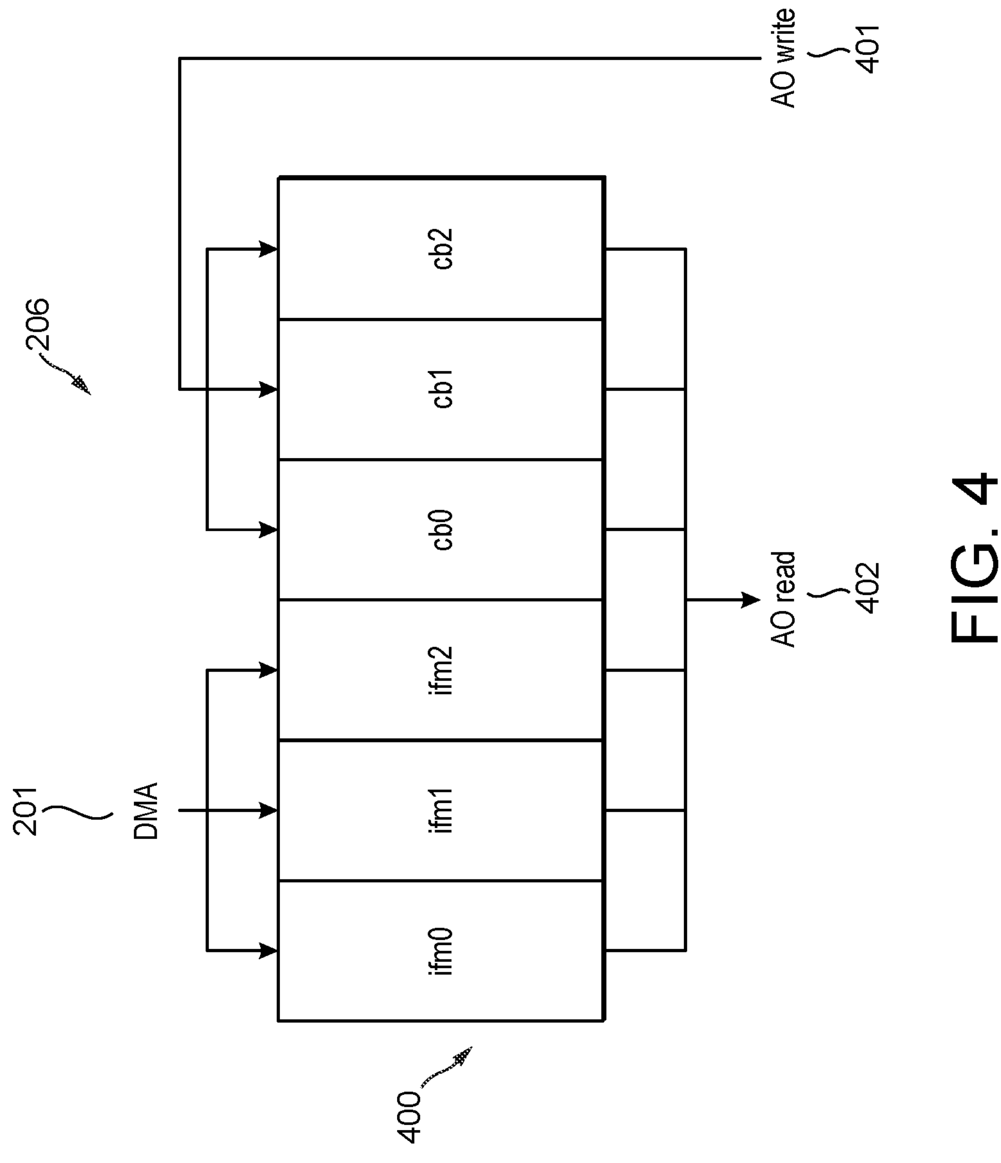
FIG. 4 shows schematically an internal buffer of a neural network processor in an embodiment.

FIG. 4 illustrates this, and shows schematically the arrangement of the chaining buffer 206 in the present embodiment. As shown in FIG. 4, the chaining buffer 206 includes six slots 400, three (ifm0, ifm1, ifm2) for input feature map data from the main memory that will be loaded 201 via the DMA unit, and three (cb0, cb1, cb2) for storing output feature map data generated by an elementwise operation in the AO unit 206 (and that will accordingly be written 401 into the chaining buffer 206 by the activation output unit).

As shown in FIG. 4, the activation output unit can read 402 data from any of the slots in the chaining buffer 206 for use as an input to an elementwise operation to be performed by the activation output unit 203.

Other arrangements for the chaining buffer 206 would, of course, be possible.

Figure 5:
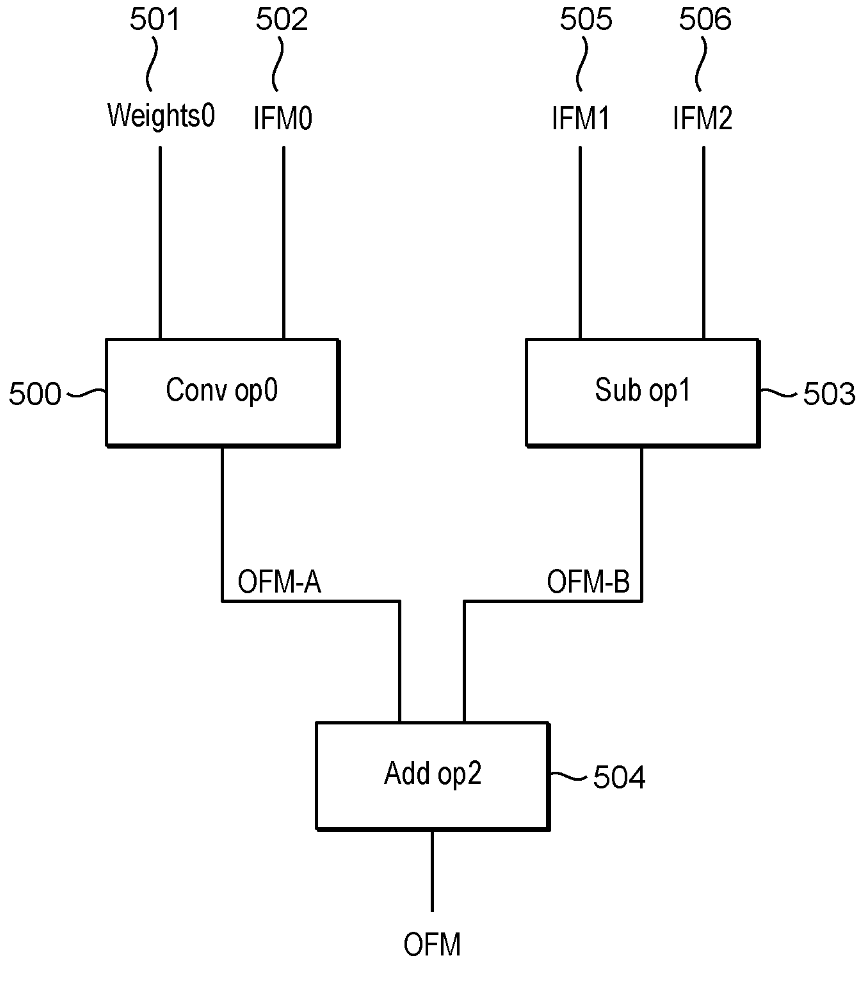
FIG. 5 shows an exemplary sequence of neural network processing operations.
Figure 6:
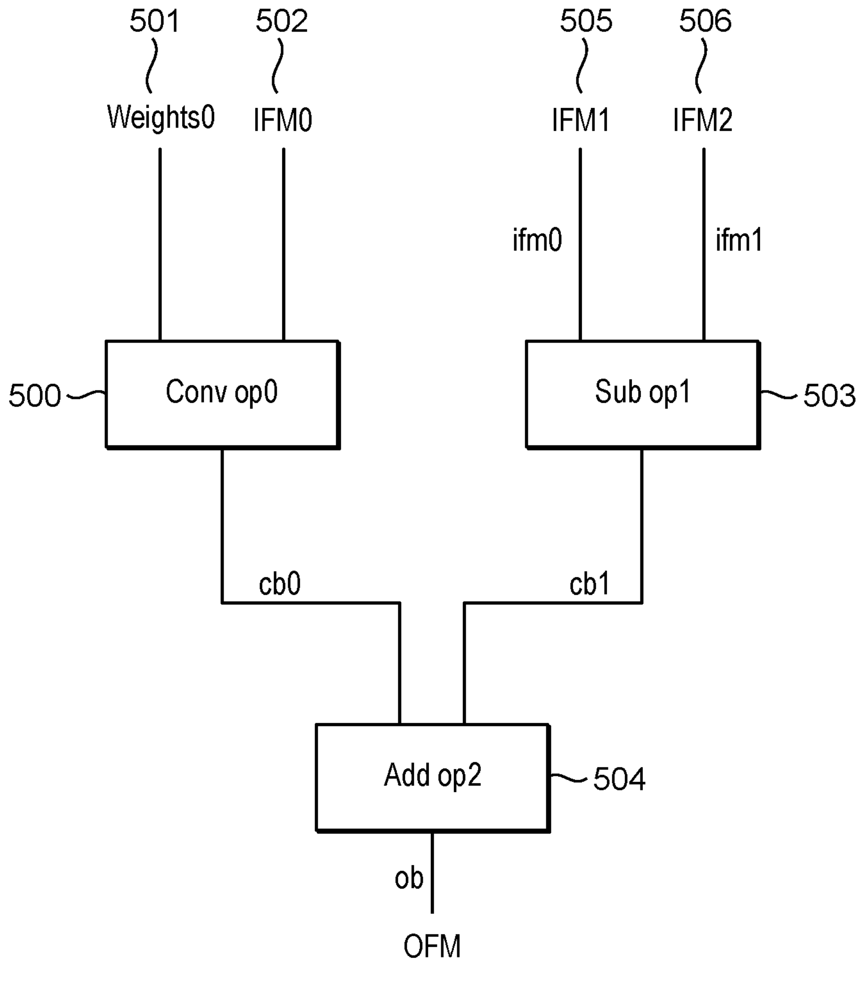
FIG. 6 shows a sequence of neural network processing operations in an embodiment.

FIGS. 5 and 6 show an exemplary sequence (chain) neural network processing operations that may be performed in the manner of the present embodiments and the technology described herein. FIG. 5 shows the sequence of operations being performed not in accordance with the present embodiments and the technology described herein, whereas FIG. 6 shows the sequence of operations being performed in the manner of the present embodiments and the technology described herein.

As shown in FIGS. 5 and 6, the sequence of operations comprises a convolution operation 500 (Cony op0) that applies a set of weights 501 (WEIGHTS0) to a first input feature map (IFM0) 502, and an elementwise subtraction operation (Sub op1) 503 that performs an elementwise subtraction of a third input feature map 506 (IFM2) from a second input feature map 505 (IFM1).

The result of the convolution operation 500 is then added in an elementwise addition operation 504 (Add op2) to the result of the elementwise subtraction operation (Sub op1) 503.

As shown in FIG. 5, the input feature maps 502, 505, 506 will be read from the main memory for these operations, and the output feature maps that are the result of the convolution operation 500 (OFM_A) and the subtraction operation 503 (OFM_B) will correspondingly be written out to the main memory, and then read back in from the main memory for the elementwise addition operation 504, with the result of that elementwise addition operation 504 correspondingly being written out to the main memory (OFM).

An exemplary command stream for performing this processing is set out below:

```
1. NPU_SET_IFM to IFM0
2. NPU_SET_WEIGHTS to Weights0
3. NPU_SET_OFM to OFM_A
4.          NPU_OP_CONV                  / /do convolution
5.          NPU_SET_IFM to IFM1
6.          NPU_SET_IFM2 to IFM2
7.          NPU_SET_OFM to OFM_B
8.          NPU_OP_ELEMENTWISE SUBTRACT / / do subtract
9.          NPU_SET_IFM to OFM_A
10.         NPU_SET_IFM2 to OFM_B
11.         NPU_SET_OFM to OFM
12.         NPU_OP_ELEMENTWISE ADD       / / do add
```

It will be seen that when performing this sequence of operations in this manner, there will be five input feature map reads from the main memory (IFM0, IFM1, IFM2, OFM_A, OFM_B) and three output feature map writes to the main memory (OFM_A, OFM_B and OFM).

FIG. 6 shows the corresponding sequence of operations to FIG. 5, but in this case, in accordance with the present embodiments and the technology described herein, the output feature map data for the convolution operation 500 is written to the chaining buffer (cb0) and the output feature map data from the subtraction operation 503 is written to the chaining buffer (cb1), and then read therefrom for the elementwise addition operation 504, rather than being written to the main memory.

In this case therefore, rather than writing out the feature maps from the convolution operation 500 and the subtraction operation 503 to the main memory, the results of those operations are written to the chaining buffer (to appropriate slots in the chaining buffer) 206, and then read therefrom for the elementwise addition operation 504.

This then avoids having to write the output feature map from the convolution operation 500 and the output feature map from the elementwise subtraction operation 503 to the main memory, and correspondingly having to read those output feature maps back in from the main memory as input feature maps for the elementwise addition operation 504.

Accordingly the operation shown in FIG. 6, which is in accordance with the present embodiments, requires only three input feature map reads (IFM0, IFM1, IFM2) from the main memory, and only one output feature map write (OFM) to the main memory (from the final elementwise addition operation 504).

An example command stream for performing this sequence of operations (and in particular for storing the intermediate results from the convolution operation 500 and the subtraction operation 503 in the chaining buffer 206) is shown below:

```
1. NPU_SET_IFM to IFM0
2. NPU_SET_WEIGHTS to Weights0
3. NPU_SET_OFM to ChainingBuffer#0
4. NPU_OP_CONV
5. NPU_SET_IFM to IFM1
6. NPU_SET_IFM2 to IFM2
7. NPU_SET_OFM to ChainingBuffer#1
8. NPU_OP_ELEMENTWISE SUBTRACT
9. NPU_SET_IFM to ChainingBuffer#0
10. NPU_SET_IFM2 to ChainingBuffer#1
```

-continued

| |
|---|
| 11. NPU_SET_OFM to OFM |
| 12. NPU_OP_ELEMENTWISE ADD |

Figure 7:
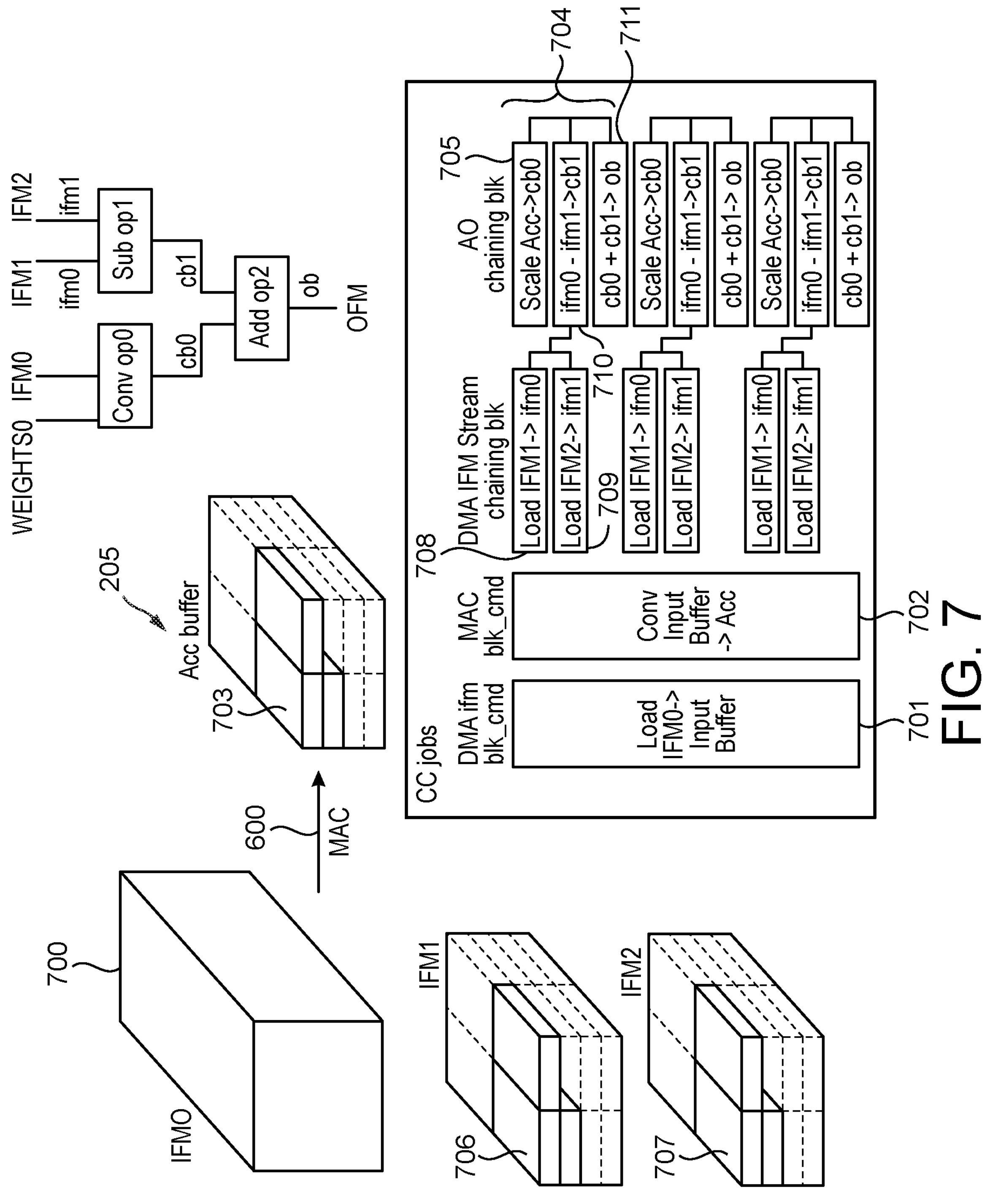
FIG. 7 further illustrates the operation in FIG. 6 in an embodiment.

FIG. 7 shows schematically the sequence of operations for a given block of the initial input data array (input feature map) when performing the sequence of neural network processing operations in the manner of the present embodiments shown in FIG. 6.

As shown in FIG. 7, a block 700 (IFM0) of the initial input feature map for the sequence of operations will be loaded 701 into the input buffer for the neural network processor via the DMA unit in response to an appropriate command therefore from the control circuit 200.

The neural network processor will then perform the convolution operation 600 using that input feature map block and store 702 the result of the convolution operation in the accumulation buffer 205. Again, as shown in FIG. 7 this is triggered by an appropriate command by the control circuit 200 in response to an appropriate command to trigger that operation.

As shown in FIG. 7, the result (the output feature map block) of the convolution operation stored in the accumulation buffer 205 is then processed as respective sub-blocks 703 from the accumulation buffer 205, with each sub-block being processed independently through the remaining operations of the sequence of operations (and the different sub-blocks from the accumulation buffer 205 being processed through the sequence of chained operations in turn). FIG. 7 illustrates this for the first three sub-blocks from the accumulation buffer 205, but as will be appreciated, this is done for each sub-block that the output from the convolution operation in the accumulation buffer is divided into.

As shown in FIG. 7, when processing 704 the first block 703 from the accumulation buffer 205, the result of the sub-block 703 in the accumulation buffer is first scaled and then stored 705 in the first slot (cb0) of the chaining buffer 206 705.

The appropriate blocks from the other input feature maps that are required for the elementwise subtraction operation 503 are also loaded 708, 709 into respective slots (ifm0, ifm1) in the chaining buffer 206 from the main memory by the DMA unit, and then the subtraction operation 503 using those input feature map sub-blocks is performed and the results stored 710 in the appropriate slot (cb1) in the chaining buffer 206.

The scaled result of the convolution operation stored in the slot cb0 and the result of the subtraction operation stored in the slot cb1 in the chaining buffer 206 are then added together in the elementwise addition operation 504, and the result stored 711 in the output buffer 306 (ob), from where the result may then be written back to the main memory by the DMA unit 201.

As shown in FIG. 7, this will then be repeated for the next sub-block of the output of the convolution operation that is stored in the accumulation buffer 205, and so on, until the chained sequence of operations has been performed for all of the sub-blocks to provide the overall output for the block 700 of the initial input data array to the convolution operation.

The process will then be repeated for another block of the initial input data array for the sequence of operations, until the entire initial input data array has been processed through the chained sequence of operations.

Figure 10:
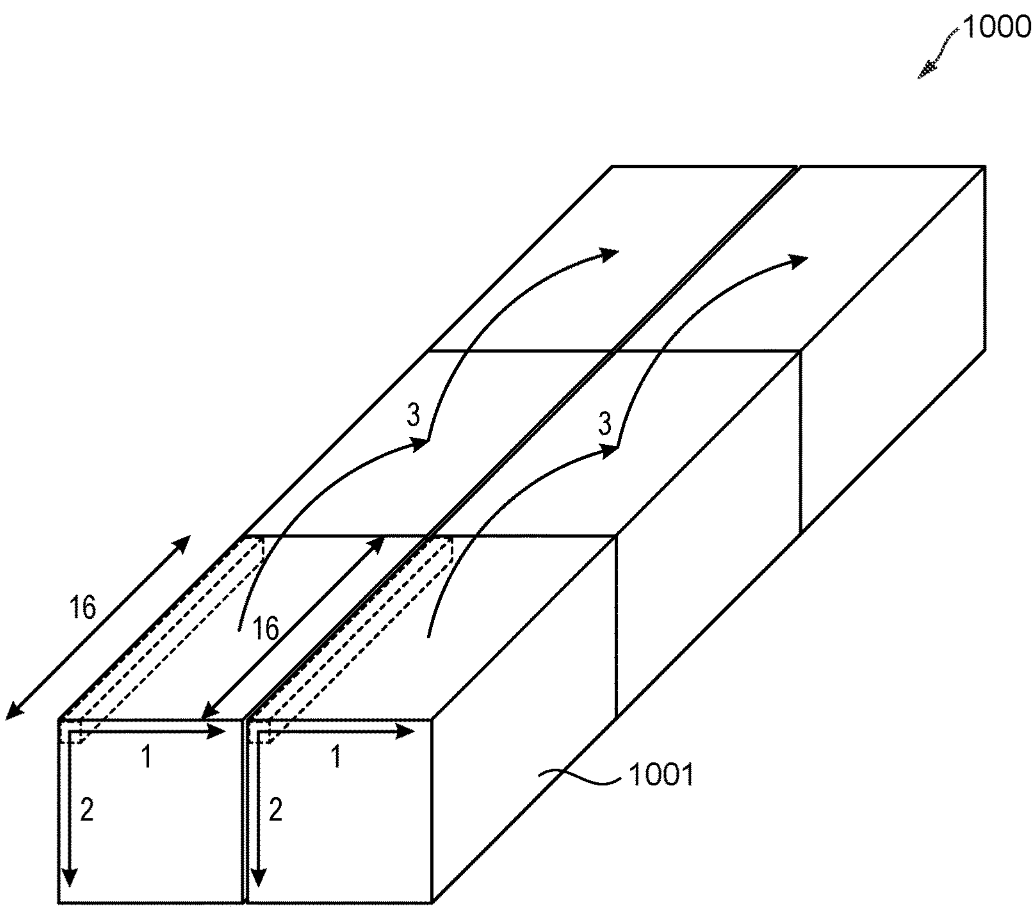
FIG. 10 further illustrates the operation in FIG. 6 in an embodiment.
Figure 10:
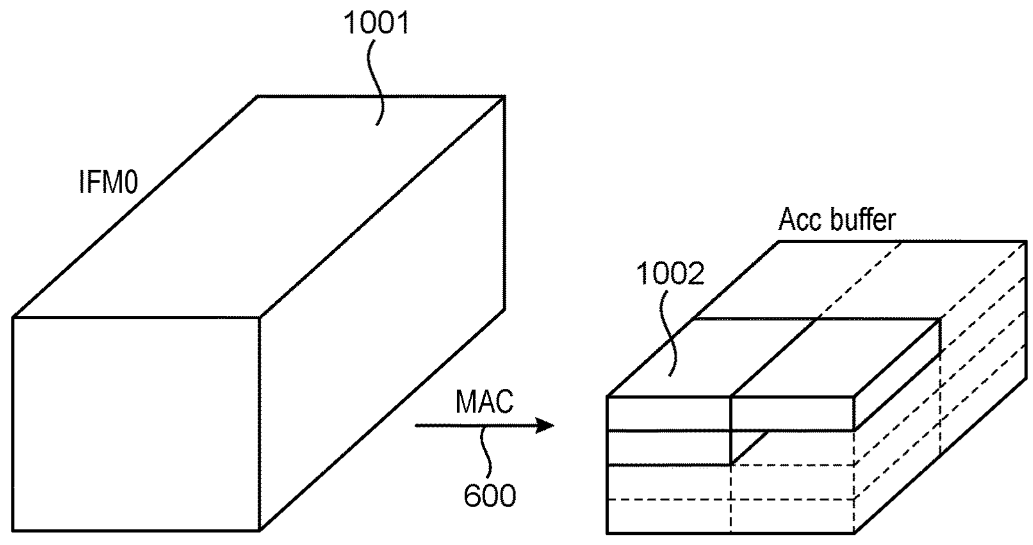

FIG. 10 illustrates this and shows the overall initial input data array 1000 for the chained sequence of operations being subdivided into a plurality of blocks 1001, which blocks are then subjected to the convolution operation 600 with the result of the convolution operation for a given block 1001 of the initial input data array 1000 then being processed as respective sub-blocks 1002 through the remainder of the sequence of operations (as discussed above).

It will be appreciated that FIGS. 7 and 10 show the subdivision of the output of the first operation in the sequence (the convolution operation 600) into sub-blocks for the subsequent elementwise operations in the sequence. However, this is not essential, and where the local storage (the chaining buffer 206) of the neural network processor can store sufficient data for the chained sequence of operations, there would, for example, be no need to subdivide the output of the initial convolution operation into sub-blocks for the subsequent elementwise operations.

It will be appreciated from the above, that the operation of the NPU 106 is controlled by the NPU 106 (and in particular the central control circuit 200 of the NPU 206) executing a suitable sequence of instructions in the command stream to cause the NPU 106 to operate in the desired manner.

Figure 8:
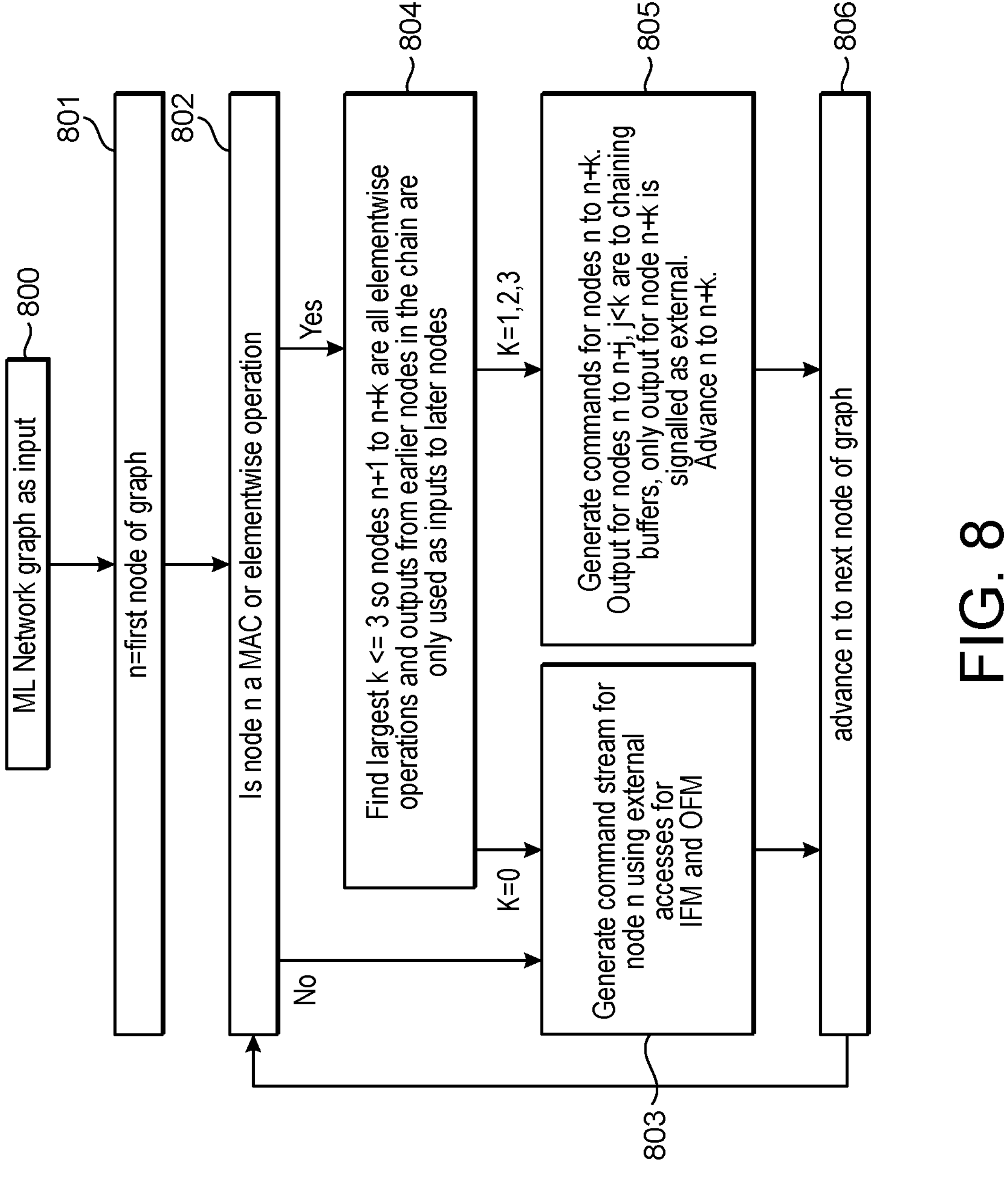
FIG. 8 is a flowchart showing an embodiment of compiler operation for performing neural network processing.

FIG. 8 shows how a set of commands (a command stream) for causing the NPU 106 to operate in the manner of the present embodiments is generated in the present embodiments. This process will be performed by an appropriate compiler 210 for the NPU 106, that will accordingly generate the sequence of commands to be executed by the NPU 106 to perform the desired neural network processing.

The compiler 210 may execute, for example, on the CPU 105 (e.g. as part of the driver 208) of the overall data processing system. Additionally or alternatively, the compilation process may be performed "offline", for example on a separate processor and data processing system to the system that includes the NPU 106, with the compiled neural network then being stored appropriately in the memory 109 for subsequent execution by the NPU 106 when the neural network processing is required.

As shown in FIG. 8, the process for generating a command stream to trigger operation in the manner of the present embodiments takes an appropriate description (definition) of the neural network processing that is required (such as the ML (machine learning) network graph) as an input (step 800).

In essence, each node of the graph (thereby defining a neural network processing operation to be performed) is considered in turn, and suitable sequences of nodes (operations) for combining into chained sequences of operations in the manner of the present embodiments are determined.

Thus as shown in FIG. 8, the process will start by considering the first node of the graph (the first operation of the overall neural network) (step 801), and determine whether that node (operation) is suitable as the first node (operation) in a chained sequence of operations in the manner of the present embodiments (step 802).

As shown in FIG. 8, in the present embodiments, this comprises determining whether the node (operation) is a MAC-based (non-elementwise) operation (an operation performed by the MAC unit, such as convolution, pooling, a min/max reduction, etc.) or an elementwise operation (either of which would be suitable to start a chained sequence of operations in the manner of the present embodiments).

If the node is not a MAC-based or elementwise operation, then an appropriate sequence of commands for the node is generated to trigger the performance of the operation for the node as a "standalone" operation (i.e. not as part of a chained sequence of operations), and using external memory accesses for the input feature maps and output feature map of the operation (node) in question (step 803).

On the other hand, when at step 802 it is determined that the operation (node) is a MAC-based or elementwise operation, the next nodes (operations) in the neural network (in the network graph) are considered to determine whether any of those nodes (operations) are suitable to be part of a chained sequence of operations with the first node.

As shown in FIG. 8, this comprises determining whether the next operations (nodes) in the neural network are elementwise operations, and whether their outputs are only used as inputs to the next nodes (operations) (step 804).

As is also shown in FIG. 8, this search is also constrained to find a maximum of three operations (node) that may be included in the chained sequence of operations with the first operation (nodes). This ensures that any chained sequence of operations in the manner of the present embodiments contains no more than four operations (and so is used to ensure that any data required for the chained sequence of operations can be contained entirely within the chaining buffer 206).

When a suitable sequence of operations (nodes) that can be chained together in the manner of the present embodiments is identified, then as shown in FIG. 8, an appropriate sequence of commands for the command stream for that sequence of operations (nodes) is generated, with the commands, inter alia, specifying that the output of all the operations for the first to the penultimate node in the sequence is to the chaining buffer 206 and only the output of the final operation (node) is to the main memory (step 805).

The process then advances to consider the next operation (node) in the neural network (step 806) and is repeated, and so on, until all the operations in the neural network have been considered (and either included as chained sequences of operations or are standalone operations in the command stream for the neural network, as appropriate).

Other arrangements for preparing the command stream would, of course, be possible.

As discussed above, the commands that are included in the command stream for causing neural network processing to be performed in the manner of the technology described herein include, inter alia, an indication of whether the input for and the output from a given operation should be fetched from/stored in the main memory or in the internal, local storage, chaining buffer 206.

To facilitate this, the commands that describe the input feature maps and the output feature maps for the neural network processing include an appropriate field (encoding) that can be used to designate the "storage mode" for the input feature map or output feature map in question, i.e. whether the feature map is/should be stored in the main memory or is/should be stored in the local storage, chaining buffer 206.

The encoding also includes an identifier for the location of the feature map within the main memory or the local storage (chaining buffer), as appropriate. In the present embodiments, for feature maps stored in the main memory, this is in the form of a memory block number (e.g. from 0 to 7). For feature maps that are stored in the local storage, chaining buffer 206, this is in the form of a chaining buffer slot number (e.g. from 0 to 2).

Other arrangements would, of course, be possible.

The sequence of commands (the command stream) that is generated also identifies those commands and neural network operations that are to be performed as a chained sequence of operations in the manner of the present embodiments. For example, the commands and command stream could include encoding to identify when an operation is (or is not) the last operation in a sequence of operations that is to be performed in a chained manner, and/or when a command and/or operation is to be performed in a "standalone" manner.

Other arrangements would, of course, be possible.

Figure 9:
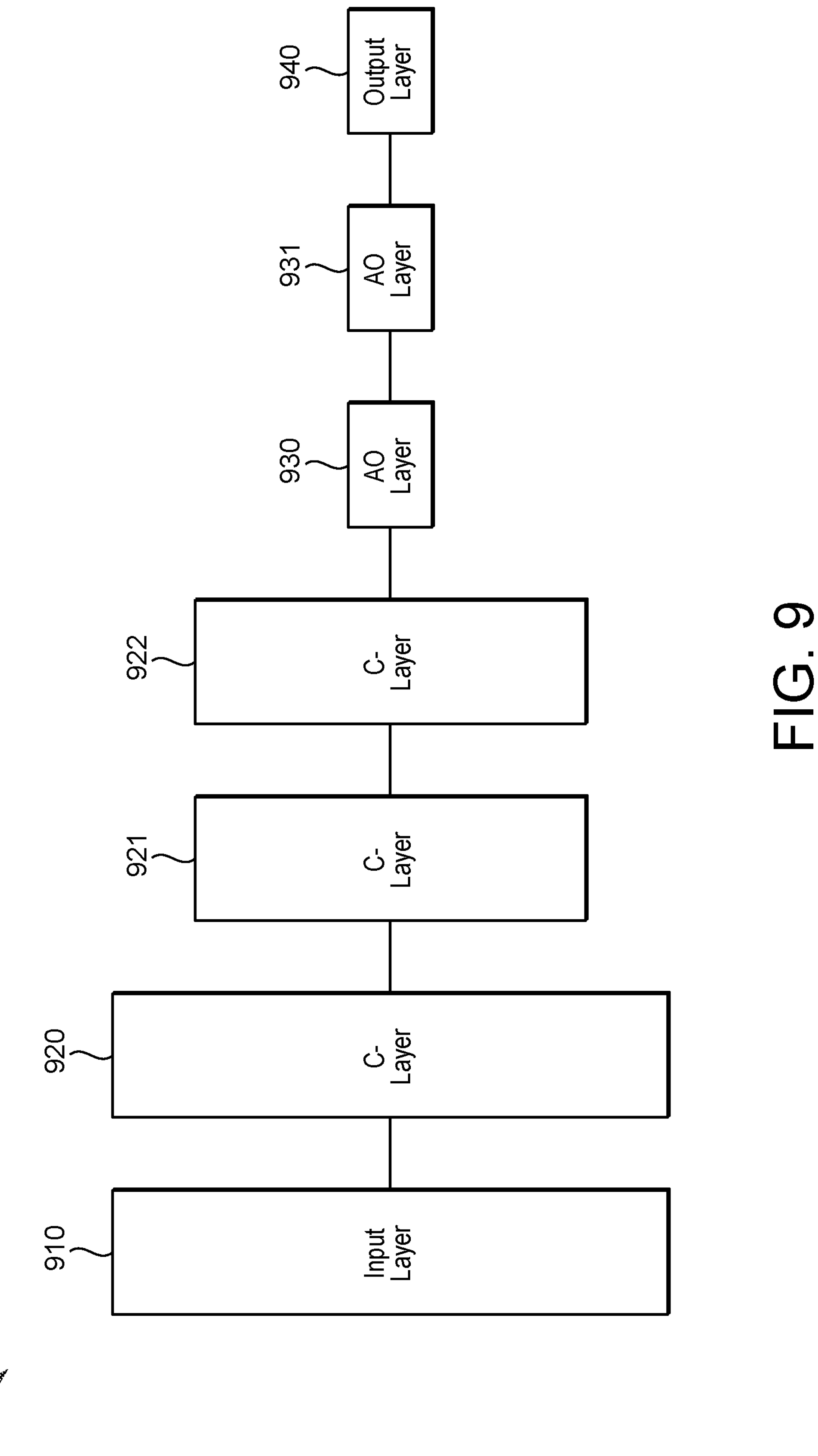
FIG. 9 shows schematically an overview of a neural network for which processing may be performed in the manner of the technology described herein.

FIG. 9 shows an exemplary neural network 900 comprising a sequence of operations that may be executed in the manner of the present embodiments (and compiled in accordance with the operation shown in FIG. 8).

The neural network may be any suitable type of neural network. In embodiments, the neural network may be a convolutional neural network (CNN), which is the type of neural network shown in FIG. 9. The neural network comprises a sequence of layers (operations) 910, 920, 921, 922, 930, 931, 940 which operate one after the other, such that the output from one layer is used as the input for a next layer.

The neural network shown in FIG. 9 has a first layer which is an input layer 910. The input layer may be adapted to receive input data (e.g. comprising data corresponding to image or sound data). The input layer may comprise a number of processing nodes which receive input data and pass that data on to the next layer of the neural network in a suitable format.

The next layer shown in FIG. 9 is a convolutional (convolution) layer (C-Layer) 920. The convolutional layer comprises an operation which applies a filter to an input data array (by convolving the filter and the input data array), in order to generate an output data array. The output data array may comprise a feature map which comprises a representation of features that were present in the input data array provided to the layer.

A pooling layer may also be provided after the convolutional layer (in FIG. 9 these are both incorporated into the convolutional layer, although it is to be understood that they can comprise separate layers). The pooling (or "downsampling") layer may operate to reduce the size of an input data array (e.g. feature map) that is input into the pooling layer. The pooling layer may produce (output) a data array (e.g. a further feature map) which is an "equivarient" representation of the data array that was input into the pooling layer (meaning that the representation is almost invariant to changes in the scale and position of features in the data array that was input into the pooling layer). In embodiments the processing required for the pooling layer may comprise applying a filter to an input data array in order to generate the output data array.

After one or more further convolutional layers 920, 921, 922 the neural network may comprise one or more elementwise layers 930, 931. The elementwise layers may operate on a data array (e.g. feature map) generated by the convolutional and/or pooling layers, and perform elementwise operations, such as addition or subtraction. The one or more elementwise layers may operate one after the other such that the data that is output from one elementwise layer is used as the input data for a next elementwise layer. The final elementwise layer may produce a final output data array or output data set which may comprise a useful output (e.g. an identification or classification of an object in the image data that was originally received by the input layer of the CNN).

The final elementwise layer 931 passes the useful output to the output layer 940 of the neural network. The output layer 940 receives the useful output data and passes the useful output data on towards other components of the data processing system which are outside of the neural network (e.g. such as further processing and display components which can display the output data, for example).

Although FIG. 9 shows a certain number of convolutional and elementwise layers, the neural network may comprise fewer or more such layers if desired (and may also or instead comprise other layers which operate in a different manner to the convolutional and elementwise layers). Other layers present in the neural network may comprise, for example, fully connected layers, deconvolution layers (for which a deconvolution operation is to be performed), etc.

When considering whether there are any operations that can be performed as a chained sequence of operations for the exemplary neural network as shown in FIG. 9 (e.g. following the procedure illustrated in FIG. 8), it will, for example, be determined that the input layer 910, convolutional layer 920 and convolutional layer 921 should be performed as standalone layers (as each of those layers is not followed by an elementwise operation layer), but the convolution layer 922 and the following elementwise layers 930, 931 can be performed as a chained sequence of operations 900, and so will be configured to be performed in that manner.

As will be appreciated from the above, the technology described herein, in embodiments, can provide a more efficient way of performing neural network processing, at least in terms of the memory bandwidth that is required and used. This is achieved in embodiments of the technology described herein, by performing sequences of neural network processing operations on a block-by-block basis, and storing data that needs to be transferred from one operation to the next in the sequence in local storage of the processor that is performing the neural network processing, rather than having to write that data out to main memory. This will reduce main memory bandwidth and correspondingly increase performance for operations that are bandwidth limited.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system, the data processing system comprising main storage operable to store data for neural network processing, and a processor comprising one or more functional units operable to execute processing for neural network processing, the one or more functional units having associated local storage operable to store data for neural network processing when the one or more functional units are performing processing for neural network processing, the method comprising:

performing by the one or more functional units processing for neural network processing, comprising a sequence of operations to process an initial input data array for the sequence of operations to generate a final output data array of the sequence of operations for respective blocks of the initial input data array on a block-by-block basis, such that the initial input data array is processed as plural blocks which are each processed independently according to the sequence of operations to generate a corresponding block of the final output data array;

wherein at least one of the operations in the sequence of operations uses output data from a previous operation in the sequence of operations as input data; and wherein performing by the one or more functional units processing for the neural network processing, comprising the sequence of operations, for a block of the initial input data array comprises:

performing the operations of the sequence of operations one after another for the block of the initial input data array to generate a block of the final output data array; and when performing an operation in the sequence of operations whose output data is to be used as input data for another operation in the sequence of operations, storing the output data which is to be used as input data for another operation of the sequence of operations in the local storage of the one or more functional units that are performing the processing for the neural network processing, and providing the output data as input data for the another operation in the sequence of operations from the local storage; and for a final operation in the sequence of operations, storing output data generated by the final operation corresponding to a block of the final output data array in the main storage.

2. The method of claim 1, further comprising storing in the local storage for use as input data for an operation in the sequence of operations, data that is loaded from the main storage.

3. The method of claim 1, wherein each operation in the sequence of operations after a first operation in the sequence of operations uses as an input the output from the previous operation in the sequence.

4. The method of claim 1, wherein plural operations in the sequence of operations after a first operation in the sequence of operations comprise elementwise operations.

5. The method of claim 1, wherein a first operation in the sequence of operations comprises a convolution or pooling operation, and plural other operations in the sequence of operations comprise elementwise operations.

6. The method of claim 1, wherein performing the neural network processing, comprising the sequence of operations, for a block of the initial input data array comprises:

performing a first operation of the sequence of operations for the block of the initial input data array as a whole, but performing one or more subsequent operations of the sequence of operations on a sub-block-by-sub-block basis, such that the block of the initial input data array is processed through the subsequent operations of the sequence of operations as a plurality of sub-blocks which are each processed independently according to the subsequent sequence of operations to generate a corresponding sub-block of the final output data array block corresponding to the block of the initial input data array.

7. A processor comprising one or more functional units operable to execute processing for neural network processing, the processor comprising:

a local storage operable to store data for neural network processing when the one or more functional units of the processor are performing processing for neural network processing; and a control circuit configured to:

cause the one or more functional units of the processor to perform processing for neural network processing, comprising a sequence of operations to process an initial input data array for the sequence of operations to generate a final output data array of the sequence of operations for respective blocks of the initial input data array on a block-by-block basis, such that the initial input data array is processed as plural blocks which are each processed independently according to the sequence of operations to generate a corresponding block of the final output data array;

wherein:

at least one of the operations in the sequence of operations uses output data from a previous operation in the sequence of operations as input data;

and to:

cause the one or more functional units of the processor to perform processing for the neural network processing, comprising the sequence of operations for a block of an initial input data array by:

performing the operations of the sequence of operations one after another for the block of the initial input data array to generate a block of the final output data array;

and:

when performing an operation in the sequence of operations whose output data is to be used as input data for another operation in the sequence of operations, storing the output data which is to be used as input data for another operation of the sequence of operations in the local storage, and retrieving the output data for use as input data for the another operation in the sequence of operations from the local storage;

and:

for a final operation in the sequence of operations, storing output data generated by the final operation corresponding to a block of the final output data array in a main storage.

8. The processor of claim 7, wherein plural operations in the sequence of operations after a first operation in the sequence of operations comprise elementwise operations.

9. The processor of claim 7, wherein the local storage that is used for storing and transferring data between operations in a sequence of operations comprises a buffer that stores locally results of elementwise operations performed as part of neural network processing.

10. The processor of claim 7, wherein the control circuit is configured to execute a sequence of commands and/or descriptors to trigger the neural network processing, and is configured to:

recognise in a sequence of commands and/or descriptors to be executed to perform neural network processing, a sequence of operations that are to be performed by the one or more functional units of the processor as a sequence of operations;

and to, when it recognises in a sequence of commands and/or descriptors to be executed to perform neural network processing, a sequence of operations that are to be performed by the one or more functional units of the processor as a sequence of operations, subdivide the processing of the initial input data array to the sequence of operations into a plurality of blocks and cause the one or more functional units of the processor to execute the sequence of operations for the respective blocks of the initial input data array on a block-by-block basis, until the sequence of operations has been completed for the entire initial input data array.

11. The processor of claim 7, wherein the control circuit is configured to cause the one or more functional units of the processor to perform processing for the neural network processing, comprising the sequence of operations for a block of the initial input data array by:

performing a first operation of the sequence of operations for the block of the initial input data array as a whole, but performing one or more subsequent operations of the sequence of operations on a sub-block-by-sub-block basis, such that the block of the initial input data array is processed through the subsequent operations of the sequence of operations as a plurality of sub-blocks which are each processed independently according to the subsequent sequence of operations to generate a corresponding sub-block of the final output data array block corresponding to the block of the initial input data array.

12. The processor of claim 7, wherein the control circuit is configured to execute a sequence of commands and/or descriptors to trigger the neural network processing, and is configured to:

in response to a first indication in a command or descriptor to be executed to perform neural network processing, cause a functional unit of the processor to read input data for an operation in a sequence of operations from main storage;

in response to a second, different indication in a command or descriptor to be executed to perform neural network processing, cause a functional unit of the processor to read input data for an operation in a sequence of operations from local storage;

in response to a third, different indication in a command or descriptor in a sequence of commands or descriptor to be executed to perform neural network processing, cause a functional unit of the processor to write the output from an operation of a sequence of operations to local storage; and in response to a fourth, different indication in a command or descriptor in a sequence of commands or descriptor to be executed to perform neural network processing, cause a functional unit of the processor to write the output from an operation of a sequence of operations to main storage.

13. A non-transitory computer readable storage medium storing computer software code which when executing on a processor performs a method of compiling a neural network to be executed by a processor operable to perform neural network processing, the method comprising:

for a neural network comprising a set of plural neural network processing operations to be performed:

determining whether there are any sequences of operations in the set of operations for the neural network that can be performed by one or more functional units of the processor as a chained sequence of operations in which:

the processing of an initial input data array for the sequence of operations through the sequence of operations to generate a final output data array of the sequence of operations can be performed on a block-by-block basis, such that the initial input data array is processed as one or more blocks which are each processed independently according to the sequence of operations to generate a corresponding block of the final output data array for the sequence of operations; and at least one of the operations in the sequence of operations uses output data from a previous operation in the sequence of operations as input data;

the method further comprising, when it is determined that there is a sequence of operations in the set of operations for the neural network that can be performed by one or more functional units of a processor as a chained sequence of operations:

generating commands and/or descriptors that when executed by the one or more functional units of the processor will cause the one or more functional units to:

perform processing for the neural network processing comprising the determined sequence of operations to process an initial input data array for the sequence of operations to generate a final output data array of the sequence of operations for respective blocks of the initial input data array on a block-by-block basis, such that the initial input data array is processed as plural blocks which are each processed independently according to the sequence of operations to generate a corresponding block of the final output data array; and perform processing for the neural network processing comprising the sequence of operations for a block of the initial input data array by:

performing the operations of the sequence of operations one after another for the block of the initial input data array to generate a block of the final output data array; and when performing an operation in the sequence of operations whose output data is to be used as input data for another operation in the sequence of operations, storing the output data which is to be used as input data for another operation of the sequence of operations in local storage for the one or more functional units of the processor that are performing the processing for the neural network processing, and providing the output data as input data for the another operation in the sequence of operations from the local storage; and for a final operation in the sequence of operations, storing output data generated by the final operation corresponding to a block of the final output data array in a main storage.

14. The non-transitory computer readable storage medium storing computer software code of claim 13, wherein determining whether the set of operations for the neural network includes a sequence of operations that can be performed perform by one or more functional units of the processor as a chained sequence of operations comprises:

determining for an operation in the set of operations for the neural network, whether that operation meets one or more criteria for use as a first operation for a chained sequence of operations;

when it is determined that the operation being considered meets the one or more criteria for use as the first operation for a chained sequence of operations, determining whether the next operation in the set of operations for the neural network is meets one or more criteria for use as a subsequent operation in a chained sequence of operations;

when it is determined that the operation being considered meets the one or more criteria for use is suitable as a subsequent operation for a chained sequence of operations, determining whether the next operation in the set of operations for the neural network meets the one or more criteria for use as a subsequent operation in a chained sequence of operations;

and so on, until an operation that does not meet the one or more criteria for use as a subsequent operation in a chained sequence of operations, or a maximum number of subsequent chained operations, is reached.

15. The non-transitory computer readable storage medium storing computer software code of claim 13, wherein determining whether the set of operations for the neural network includes a sequence of operations that can be performed by one or more functional units of the processor as a chained sequence of operations comprises:

determining whether there is a sequence of operations that starts with a non-elementwise or elementwise operation, followed by one or more elementwise operations, and in which the output of each operation is used as an input to the next operation.

16. The non-transitory computer readable storage medium storing computer software code of claim 13, wherein the generated commands and/or descriptors indicate whether input data for an operation of the sequence of operations is to be read from local storage of the one or more functional units that are performing processing for the neural network processing or main storage, and whether the output of an operation of the sequence of operations is to be stored in the local storage, or is to be written to main storage.

17. The non-transitory computer readable storage medium storing computer software code of claim 13, wherein the generated commands and/or descriptors indicate whether a neural network processing operation triggered by the command(s) is part of a chained sequence of operations or not.

18. The non-transitory computer readable storage medium storing computer software code of claim 13, wherein generating the sequence of neural network processing commands and/or descriptors for execution by one or more functional units of a processor comprises selectively including in the generated sequence of neural network processing commands one or more of:

a first form of indication that indicates that an input for an operation should be read from main storage;

a second, different form of indication that indicates that an input for an operation should be read from local storage;

a third, different form of indication that indicates that the output from an operation should be stored in the local storage; and a fourth, different form of indication that indicates that the output from an operation should be stored in the main storage.

19. The method of claim 1, wherein the main storage comprises on-chip and/or off-chip storage.

20. The method of claim 1, wherein one or more descriptors indicate for the operations in the sequence of operations, a storage mode for the inputs and outputs to the operations.

21. The method of claim 1, wherein when an operation is determined not to meet one or more criteria for incorporation into the sequence of operations, performing said operation as standalone operation.

* * * * *